United States Patent [19]

Petersen et al.

[11] Patent Number: 5,225,978
[45] Date of Patent: Jul. 6, 1993

[54] DOCUMENT PROCESSING SYSTEM HAVING INTEGRATED EXPERT MODULE

[75] Inventors: Chris E. Petersen, Plymouth; Norman P. Kern, Birmingham; Pratap G. Kotecha, Plymouth; Laura A. Baptist, Wixom; Kevin J. Koehne, Canton; Ramesh Narayanan, Novi, all of Mich.; John T. Blasdale, Doylestown, Pa.

[73] Assignee: Unisys Corp. (Formerly Burroughs Corp.), Detroit, Mich.

[21] Appl. No.: 302,700

[22] Filed: Jan. 25, 1989

[51] Int. Cl.⁵ .............................. G06K 3/00
[52] U.S. Cl. .................. 364/408; 364/406; 395/11; 395/51; 395/925; 235/379
[58] Field of Search ........... 364/406, 408, 705.02, 364/513; 235/379; 395/50, 51, 925, 11

[56] References Cited

U.S. PATENT DOCUMENTS

| | | | |
|---|---|---|---|
| 4,027,142 | 5/1977 | Paup et al. | 235/475 |
| 4,264,808 | 4/1981 | Owens et al. | 235/379 |
| 4,404,649 | 9/1983 | Nunley et al. | 235/379 |
| 4,417,136 | 11/1983 | Rushby et al. | 235/379 |
| 4,713,761 | 12/1987 | Sharpe et al. | 364/406 |
| 4,727,243 | 2/1988 | Savar | 364/406 |
| 4,926,325 | 5/1990 | Benton et al. | 364/408 |
| 4,949,278 | 8/1990 | Davies et al. | 364/513 |

*Primary Examiner*—Allen R. MacDonald
*Attorney, Agent, or Firm*—Nathan Cass; Mark T. Starr

[57] ABSTRACT

A bank document processing system for processing checks, deposit slips and other financial documents which advantageously combines an automatic expert reconciliation system with conventional multi-tasking document processing apparatus so as to enable the expert reconciliation system to function as an integral part of the overall document processing system. In particular, the combined system allows expert and conventional data processing systems to efficiently and automatically communicate with one another and an operator so that expert solutions as well as conventional prebalancing results can be displayed to the operator to permit him to expeditiously perform transaction balancing functions without the need for the operator to have special expertise in finding these solutions.

18 Claims, 25 Drawing Sheets

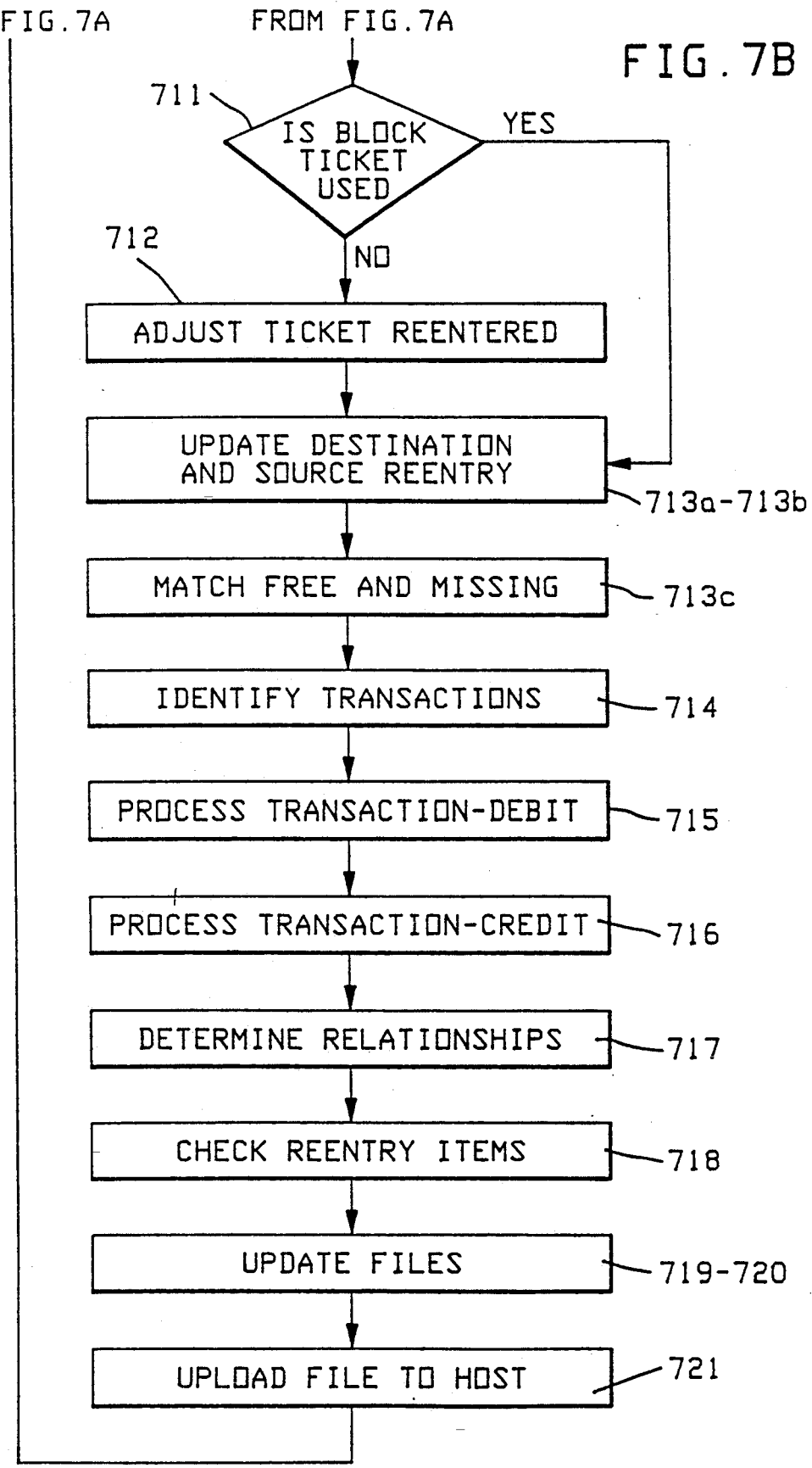

FIG. 10-1

| HELP | | | BLOCKS TO BALANCE | | 1 OF 1 | |
|---|---|---|---|---|---|---|
| STATUS | NUMBER | JOB# | DEBITS OFF | CREDITS OFF | BATCHES BALANCED | BATCHES TO VERIFY |
| 2 | 3052 | 9341 | 1,000.00 | 0.00 | 24 | 4 |
| 2 | 3054 | 9541 | 8.00 | 0.00 | 29 | 9 |
| 2 | 3054 | 9541 | 137,154.62- | 0.00 | 22 | 14 |
| 2 | 3056 | 9541 | 31,284.75- | 0.00 | 32 | 1 |
| 2 | 3058 | 9361 | ----CHANGE STATUS---- | 0.00 | 21 | 12 |
| 2 | 3059 | 9361 | | | 29 | 9 |
| 2 | 3060 | 9721 | TYPE IN YOUR OPERATOR ID. | | 4 | 8 |
| 2 | 3061 | 9361 | PRESS <GO> TO ENTER. | | 21 | 6 |
| 2 | 3062 | 9361 | PRESS <F10> TO CANCEL. | | 49 | 6 |
| 2 | 3063 | 9361 | | | 30 | 1 |
| 2 | 3076 | 9721 | | 17.72- | 0 | 7 |
| 2 | 3077 | 9721 | 775.75- | 0.00 | 0 | 1 |
| 2 | 3078 | 9721 | 41,616.98- | 0.00 | 0 | 2 |
| 2 | 3092 | 9721 | 139.28 | 0.00 | 0 | 1 |
| S | 3094 | 9721 | 9,300.00- | 0.00 | 0 | 1 |

<GO>-SELECT    |RETURN--

FIG. 10-2

```
|----------------------------------|-------------------|----------------------------|
| BLOCK: 4321                      | BATCHES TO VERIFY | RELATIONSHIPS              |
|----------------------------------|-------------------|----------------------------|
| BATCH   PG    DEBITS OFF   CREDITS OFF              | PROBLEMS(S)/SOLUTION       |
|----------------------------------|-------------------|----------------------------|
| *  3     6       0.50         0.00                  | DEBIT MISREAD ITEM         |
| * 10    10       3.00         0.00                  | DEBIT MISREAD/EXTRA        |
|   18    18      15.00         0.00                  | DEBIT SWITCH               |
| ⊥ 26    26      15.00         0.00                  | DEBIT SWITCH               |
|----------------------------------|-------------------|----------------------------|
| TOTALS          3.50          0.00    DIFFERENCE:     3.50                        |
|-----------------------------------------------------------------------------------|
| PRINT |       | INFO | RELATE ||PREBAL| REENT | RETURN|
```

FIG. 10-3

| BLOCK: 4321 | BATCHES PREBALANCED |
|---|---|
| BATCH # | SOLUTIONS |
| 34 | DEBIT BALANCED ON ENTRY.CREDIT OVER/SHORT |
| 35 | DEBIT BALANCED ON ENTRY.CREDIT OVER/SHORT |
| • 38 | CREDIT OVER/SHORT |
| 42 | CREDIT OVER/SHORT |
| 47 | DEBIT.OVER/SHORT.SOURC...D.DESTINATION REENTRY |
| 48 | TICKET REENTRY WRONG |

|--PRINT| | | |INFO| ||EXPERT|REENT|RETURN--|

FIG. 10-4

| BLOCK: 4321 | PROBLEM/SOLUTION | BATCH: 66 |

PROBLEM/SOLUTION : DEBIT SWITCH/REENTRY ERR      CONFIDENCE : 100%

ORIGINAL TICKET AMOUNT : 32,656.23
ADJUSTED TICKET AMOUNT :
REMAINING REJECT AMOUNT :         0.00

```
                 DEBITS         CREDITS
       PRIME    32,656.23          0.00
       REENTRY      66.00         60.00
       TOTAL    32,722.23      32,722.23 ≠
       DIFFERENCE   66.00         60.00 ≠
```

SWITCH BATCHES
   CREDIT TRANSACTION BATCH : 57      CREDIT TRANS BATCH
        SWITCH BATCH                          57
            65

```
        AMOUNT    •PK•    SEQ     TRANSIT      AUXILIARY     TC      D/
                                                                      C
P 66     00       •64•    1774    0759-1185      10667
R 66   6600        04     1774
```

|---PRINT|  ||  |ACCT|  |INFO|  ||  |RETURN---|

FIG. 10-5

| BLOCK: 4321 | PROBLEM/SOLUTION | BATCH: 89 |

PROBLEM/SOLUTION : DEBIT S-REJECT       CONFIDENCE : 90%

ORIGINAL TICKET AMOUNT :   22,302.32
ADJUSTED TICKET AMOUNT :    5,770.00
REMAINING REJECT AMOUNT :

|  | DEBITS | CREDITS |
|---|---|---|
| PRIME | 16,532.32 | 22,302.32 |
| REENTRY | 0.00 | 0.00 |
| TOTAL | 16,532.32 | 22,302.32 |
| DIFFERENCE | 5,770.00 | 0.00 |

REENTRY HISTORY-REJECTS ------------------------------------

| | AMOUNT | •PK• | SEQ | TRANSIT | AUXILIARY | TC | D/C |
|---|---|---|---|---|---|---|---|
| R 89 | 77000 | •53• | 8 | 0910-1667 | | 01 | |
| R 89 | 500000 | •62• | 9 | 0910-0002 | | | |

|—PRINT| | | | |ACCT | INFO | | | | |RETURN—|

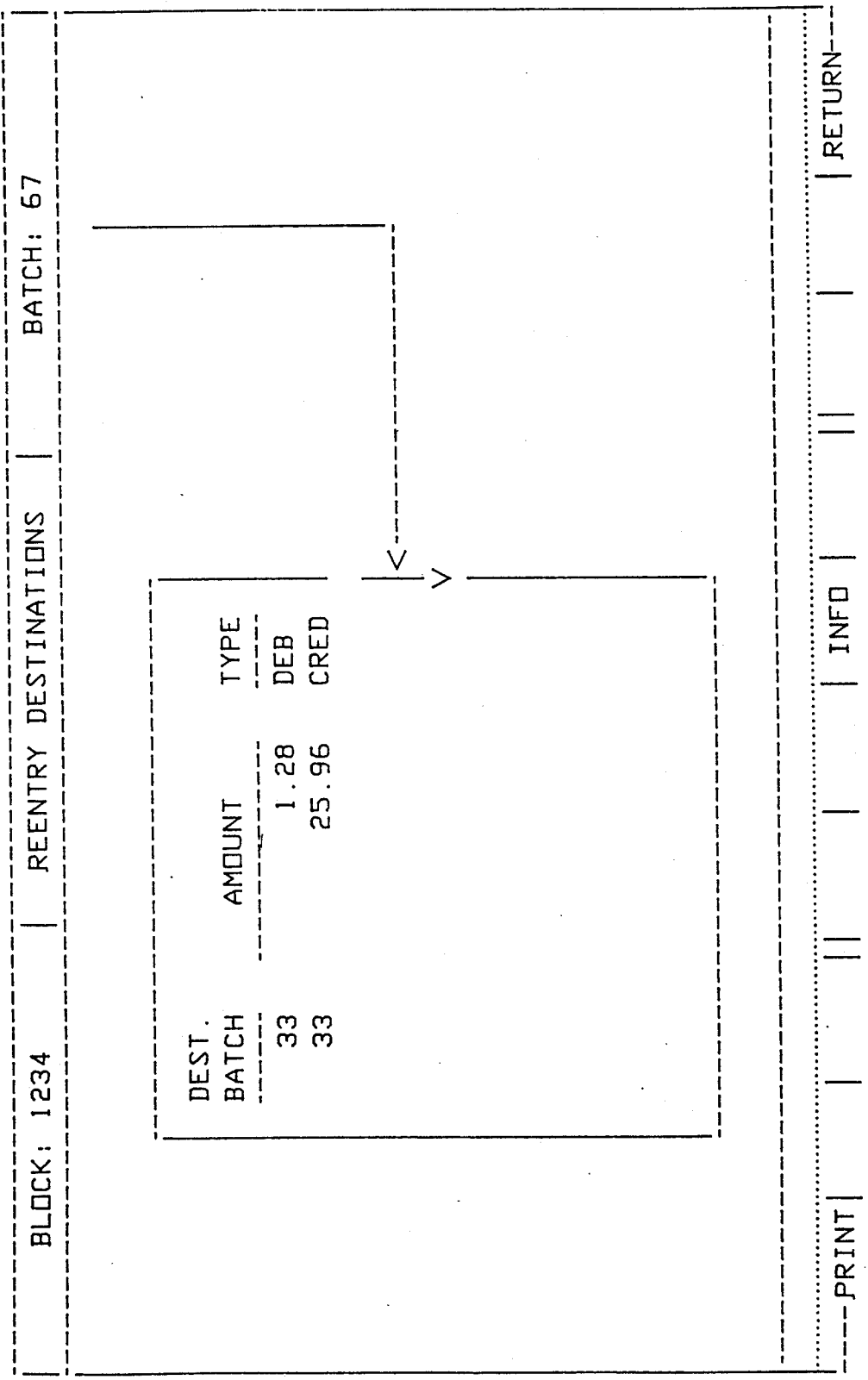

FIG. 10-8

```
| BLOCK: 4321 |   | CREDIT OVER/SHORT |   | BATCH: 12 |

BEFORE TRANSACTION BALANCING              AFTER TRANSACTION BALANCING

BATCH    DEBIT      CREDIT                    DEBIT      CREDIT
 12      30.00-    1,922.55-                   30.00-       .00
 13        .00     1,372.84-                     .00        .00
 14        .00       549.71-                     .00        .00
```

--PRINT|   |   |   |   | INFO |   |   | RETURN--

FIG.10-9

```
|-------------------------------------------------------------------------------|
| BLOCK: 4321        | TICKET REENTRY WRONG |        BATCH: 98                  |
|-------------------------------------------------------------------------------|
|                                                                               |
|  ORIGINAL TICKET AMOUNT  :   47,621.05                                        |
|  CORRECTED TICKET AMOUNT :   23,718.62                                        |
|                                                                               |
|  REENTRY HISTORY:                                                             |
|           AMOUNT    *PK*    SEQ.     TRANSIT       AUXILIARY       TC    D/   |
|                                                                          C    |
|  P 482   2371862    *99*    547    4444-0000    20000000000000    42          |
|  R 482   4762105    *99*    547    4444-0000    20000000000000    42          |
|                                                                               |
|  BATCH SUMMARY:                                                               |
|    ORIGINAL TICKET AMOUNT   :    47,621.05                                    |
|    ADJUSTED TICKET AMOUNT   :    23,718.62                                    |
|    REMAINING REJECT AMOUNT  :          .00                                    |
|                                  DEBITS            CREDITS                    |
|              PRIME           23,718.62           23,718.62                    |
|              REENTRY              0.00                0.00                    |
|              TOTAL           23,718.62 ≠         23,718.62 ≠                  |
|              DIFFERENCE           0.00 ≠              0.00 ≠                  |
|                                                                               |
|-------------------------------------------------------------------------------|
|----PRINT|   ||     ||     | ACCT | INFO |     ||     ||     | RETURN----      |
```

FIG.10-10

| BLOCK: 4321 | | MIXED BATCH TICKET | | BATCH: 35 |
|---|---|---|---|---|
| MIXED BATCH | ORIGINAL TICKET AMOUNT | CHANGED TICKET AMOUNT | DEBIT TOTAL AMOUNT | NEW DEBIT DIFFERENCE AMOUNT |
| 34 | 123.23 | 9,232.32 | 9,232.32 | 0.00 |

|---PRINT| | | | |INFO | | |RETURN---|

FIG. 10-11

BLOCK: 4321  REENTRY HISTORY  BATCH: 3

|   |    | AMOUNT  | *PK* | SEQ.  | TRANSIT   | AUXILIARY | TC    | D/C |
|---|----|---------|------|-------|-----------|-----------|-------|-----|
| P | 3  |  100000 | *57* |   587 | 3333-3333 |           |       |     |
| R | 3  |  100000 | *52* |   587 | 0000-0000 |           |       |     |
| P | 4  | 1033000 | *53* |   713 | 8763-3393 |           |       |     |
| R | 4  | 1033000 | *53* |   713 | 8763-3393 |           |       |     |
| M | 10 |    2500 | *59* |  3649 | 3243-3332 |           | 0000? |     |
| P | 10 |    2500 | *57* |  3655 |           |           |       |     |
| R | 10 |    2500 |  18  |  3655 |           |           |       | D   |
| F | 11 |   10525 |  04  | 90001 | 3242-4760 |           |       | D   |
| P | 11 |      00 | *74* |  4170 |           |           |       |     |
| R | 11 |    2500 |  04  |  4170 | 3242-4640 |           |       | D   |
| P | 11 |      00 | *74* |  4171 |           |           |       |     |
| R | 11 |    5225 |  04  |  4171 | 3243-4723 |           |       | D   |
| P | 11 |      00 | *74* |  4172 |           |           |       |     |
| R | 11 |   11625 |  04  |  4172 | 5243-0333 |           |       | D   |

---- WORKING ----

|--PRINT|  ||  ||  | ACCT | INFO | MATCH || | RETURN--|

FIG. 10-12

| HELP | PROBLEM SOLUTION | 2 OF 2 |
|---|---|---|

BATCH SUMMARY
DISPLAYS A SUMMARY OF BATCH TOTALS.

```
            FIELD                   DESCRIPTION
            ORIGINAL TICKET AMOUNT  THE ORIGINAL AMOUNT OF THE BATCH TICKET.
            ADJUSTED TICKET AMOUNT  THE NEW TICKET AMOUNT, IF DIFFERENT THAN
                                    THE ORIGINAL TICKET AMOUNT.
          ┌ REMAINING REJECT AMOUNT THE REMAINING REJECT ITEMS AMOUNT.
DEBIT     │ PRIME                   THE PRIME PASS ITEMS AMOUNT.
AND       │ REENTRY                 THE TOTAL AMOUNT OF THE REENTRY ITEMS.
CREDIT    │ TOTAL                   THE BATCH ITEMS TOTAL.
          └ DIFFERENCE              THE DIFFERENCE BETWEEN TOTAL AMOUNT AND
                                    TICKET AMOUNT.
```

ACTIVE KEYS:
  F1 - PRINTS SCREEN TO CONFIGURED PRINTER.
  F6 - DISPLAYS GENERAL BLOCK INFORMATION.
  F10 - RETURN TO BATCHES TO VERIFY SCREEN.

<NEXT PAGE>,<PREV PAGE> FOR MORE.

|PRINT| | | |RETURN|

FIG. 11

| STATUS | NUMBER | INST | BLOCKS TO BALANCE | | BATCHES BALANCED | BATCHES TO VERIFY |
|---|---|---|---|---|---|---|
| | | | DEBITS OFF | CREDITS OFF | | |
| 2 | 7587 | 1111 | 102.94- | 102.94 | 22 | 8 |
| 2 | 7595 | 1111 | 3,035.61 | 66,927.64- | 20 | 9 |
| P | 6789 | 3333 | 773.44- | 123,454.99 | 40 | 20 |
| 1 | 7499 | 2222 | 82.72- | 0.00 | 0 | 1 |
| C | 7891 | 2222 | 23,156.55≠ | 43.95≠ | 35 | 5 |
| S | 8656 | 3333 | 2,345,678.99 | 0.37- | 0 | 61 |

| PRINT | SORT. | CHG ST | \<GO\>-SELECT | INFO |

DOCUMENT PROCESSING SYSTEM HAVING INTEGRATED EXPERT MODULE

FIELD OF THE INVENTION

This invention relates generally to the field of document processing systems, and more particularly to bank document operations in which check and deposit slips and other transactions are processed through the banking system, and this application relates particularly to such systems and provides a new expert reconciling system to replace prior manual systems, and to the document processing apparatus, the system, methods and apparatus for integrating expert and conventional data processing control structures and language controls therefore which enable the expert reconciling system to function as part of and in a conventional data processing environment. The expert reconciler system combines an expert system with a computer system for expert reconciliation of checks and other items in a bank's system.

BACKGROUND OF THE INVENTION

In the banking system, there are many banks. There are in such banks a variety of individual units, systems and apparatus, which process items such as checks, debit and credit items, and other documents, herein referred to sometimes as items or tickets, through the banking system.

Representative examples of art which may be reviewed by those interested in this historical literature include, as example, U.S. Pat. No. 3,587,856 to Lemelson; U.S. Pat. No. 3,674,924 to Fischer et al.; U.S. Pat. No. 3,868,478 to Zeenkov; U.S. Pat. No. 3,903,517 to Hafner (representing in part the Cummins 4400 KeyScan Multimedia Data Entry System, a key/disk system). Later patents and literature which may be of interest include U.S. Pat. No. 4,027,142 to Paup; U.S. Pat. No. 4,028,733 to Ulicki; U.S. Pat. No. 4,056,828 to Furuta; U.S. Pat. No. 4,064,389 to Patterson; U.S. Pat. No. 4,070,694 to Sakamoto; U.S. Pat. No. 4,077,034 to Dell; U.S. Pat. No. 4,081,842 to Harbaugh; U.S. Pat. No. 4,082,945 to Van De Goor; U.S. Pat. No. 4,090,233 to Holt; U.S. Pat. No. 4,091,424 to Widergren; U.S. Pat. No. 4,096,520 and U.S. Pat. No. 4,096,526 to Furata; U.S. Pat. No. 4,126,779 to Jowers; U.S. Pat. No. 4,135,214 to Weber; U.S. Pat. No. 4,139,869 to Holt; U.S. Pat. No. 4,149,192 to Takewchi; U.S. Pat. No. 4,152,697 to Rider et al; U.S. Pat. No. 4,163,260 to Hisao et al; U.S. Pat. No. 4,167,758 to Rothgordt; U.S. Pat. No. 4,193,097 to Kwrahavashi et al; U.S. Pat. No. 4,205,780 to Burns et al; U.S. Pat. No. 4,207,599 to Murayama et al; U.S. Pat. No. 4,254,438 to Yamazaki et al; U.S. Pat. No. 4,404,649 to Nunley; U.S. Pat. No. 4,298,895 to Arai et al; U.S. Pat. Nos. 4,087,788; 4,201,978; 4,410,965; 4,412,252; 4,510,618; 4,523,330; 4,555,617; 4,564,752; 4,613,986; 4,680,803; 4,685,141; (all assigned to NCR); U.S. Pat. No. 4,510,619 to Lebrun et al and U.S. Pat. No. 4,672,186 assigned to BancTec Inc.

The present application employs a general purpose host system and workstations, such as the Unisys B20 series, computer systems and workstations which were marketed by Unisys corporation prior to the presently described inventions. The host systems have incorporated an Item Processing System known as the IPS701. The Item Processing System represents a standard host as part of a data based file system. Also, the ability to read and sort checks into bundles at high rates is known by the Unisys DP1800 series of processor sorters.

The banking systems currently in place allow for high speed reading and sorting of checks. They also allow for high speed data processing of data both before and after reconciliation. Banks have item processing systems, which allow checks to be read and sorted in accordance with the routing codes for various bank destinations. Once sorted, the results of sorting are bundled into bundles and physically transferred t the receiving bank. The receiving bank also generally is supplied with data tapes, which may include magnetic media and physical documents, usually large printouts and processing tapes. The receiving bank is given a charge for the balances which are due to the sending bank. This is a high speed process. Likewise, the bank's accounting is a high speed computer process. If the receiving banks would automatically accept the sending banks information, the whole process would be a very high speed process.

However, the receiving bank does not do so. The bank needs to verify the physical documents for its customers, and to verify that the sending bank correctly represented all transactions for which it claims a credit or debit. This is a bottleneck called reconciliation.

The present description of our inventions and improvements addresses this bottleneck, and in the course of providing a solution to reduce the amount of time and manpower involved in the bottleneck had to overcome many problems, and we have solved them as described in this application.

Reconciliation has to date been primarily a manual operation, assisted somewhat by calculators and other expedients of expert reconcilers, human experts who know what goes wrong in the transfer of documents between banks of the system, and how to reconcile what is represented to have been sent to a bank with what has been received by the bank. This information is necessary for banks to reconcile their transfer accounts on a daily basis and necessary for the banking system in the United States to function.

The problem of reconciliation is the need to balance a group (a "block" or bundle, having batches) of checks and other documents (credit and debit entries, deposit entries, item memos, etc.) of one sending bank at a bank which receives these documents. These units of documents in any given day may represent 100,000, 200,000 or more documents, a massive number, not readily handled efficiently manually, but this is the current method employed for want of a solution to the problems associated with reconciliation. At the originating or sending bank, the checks are sorted into bundles or batches. These documents, together with a summary printout (or data tape) is sent to the receiving bank which needs to verify the correctness of the accounting made by the sending bank. This bank reads and sorts the checks, and does its own reconciliation in a manner similar to the household checking account of a depositor customer, but applicable to a particular received batch or bundles of checks. These terms "batch" and "bundle" are known in this art. Here in the prior art the "expert" is a person, a reconciler. In our program we refer to a bundle as a block and a batch as a batch.

This expert person is not normally a programmer, but an experienced person who knows from experience gained in the process, what can go wrong with the process. This experience is not readily transferred from one person to another. There are very many variables to consider, and man possible solutions.

There are usually a group of several "expert" reconcilers at any bank. Each one will have a different level of experience. The programs used by these persons are conventional programs. These conventional programs will insert the credits in one column, the debits in another column, and if the columns values are identical, they are said to balance. This kind of processing is routinely and very easily handled by conventional data processing, with code written generally in COBOL or PASCAL, two higher level languages.

The problem to be solved, if you will, is how to make the process of reconciliation better, more efficient, and able to be implemented by operators with minimal or less than full expert knowledge. The present application describes an effective solution to this problem formerly handled by manual labor and a calculator.

The inventors described herein, combine and overlap at least three separate and distinct arts, that of "Expert" systems and their programming, represented by the KES expert language system, those of iterative workstations and their numerical programming represented by commercial workstations of the type sold by Unisys Corporation and others which could implement single or multi-tasking operation systems, represented by BTOS or the new multitasking OS systems of Microsoft, which are applicable to the class of PC's represented by Intel's 90186, 80286 and 80366 series of microprocessors, which also could implement MS-DOS, and the conventional prereconciliation processes for balancing checks or like documents in the form of bundles or batches sent from one bank to another, as represented by Unisys Corporation Financial Information Systems.

These arts to our knowledge, have never been combined. We have made various inventions in each field, in addition to the combination of the various inventions to make an expert reconciler for a bank's computer system which will perform on a routine basis, many of the functions heretofore performed manually.

Elements of the system have existed prior to our invention. Our invention employs a 16 bit computer system, and is preferably implemented in connection with various combinations made with standalone computer systems of the kind sold by Unisys Corporation (a Delaware corporation), as their B20 series, which include a processor based upon the processors sold by Intel Corporation (of the U.S.A. and clones of these systems) known as 80186, 80286 and 80386. The Unisys Corporation systems have an operating system known as BTOS which permits various workstations of the series to communicate between themselves, and act as a cluster of workstations, with at least one workstation of the cluster acting as a file server and having a disk. In addition the systems described may as part of the inventions described with a Unisys V Series medium system host module which implements the prior Financial Information system which could tally the credits and debits in a batch and display whether or not the batch actually balanced.

Communication links between workstations and medium system hosts are also known. Changes have been made to these systems in order to implement the expert reconciler.

Certain processes of the system are implemented in known languages, including "C" and "Pascal" and "COBOL", general purpose higher level computer languages provided by a variety of vendors in the computer field, usually implemented with compilers for "C" and "Pascal" for workstations, with the addition of "COBOL" for medium systems. As an example, ASCII standard "C" allows one "C" program to call another program, or even another program or subroutine written in another language, such as PASCAL or FORTRAN, and complied with the language's compiler. While no changes have been made to the languages themselves, the expert reconciler utilizes these general purpose higher level computer languages to create new drive code for the expert reconciler system.

Also known, was a language expert advisor system known as "KES". We have during the process of inventing the disclosure herein used KES. Accordingly, as prior art we recognize the compiler for a language known as "KES", an "expert" language, in its version known one year prior to the filing date of this original application. That "KES" language is marketed by Unisys Corporation and Software A&E (Software Architecture and Engineering) of Arlington, Va., U.S.A. That version of KES (a version known as 2.0) is representative of the "expert systems" in commerce. These are advisor systems designed to act as standalone systems. These "expert systems" use a system of rules, whether the system is rule based or frame based, and information in the form of expertise is sorted. These "expert" systems allow a less experienced person to interact with the information for having that system help solve a problem. In general, the expert systems are very inefficient in doing computations, and they are not integrated to other systems. Some "expert" systems may have permitted access of the user to go to a spreadsheet package, a "Lotus" or something like that, and KES in its earlier version allowed, and indeed required, the user to write a "C" level routine which was to become part of the KES expert advisor program and which "C" program shared the KES library and called and returned values to certain KES library functions. However, in general if an "expert" system needs to do number crunching, many additions and subtractions representative of a balancing transaction and efficiently handles by "conventional" processing, the expert system can not do it or can't do it efficiently. Furthermore, KES and other prior art systems could not be integrated with an interactive "conventional" processing system which shared a large information database. As a result the prior art "expert systems" could not interact with the conventional data processing systems. Instead of operating like the systems which we describe in this application, these prior arts systems are prompted or controlled by the operator. Thus in order to accomplish the tasks, the operator needs to be an expert himself, selecting what operations need to be performed. Furthermore the conventional data processing structures did not permit the operator to perform a balancing task automatically and call upon the programmed expertise to perform expert tasks.

SUMMARY OF THE INVENTIONS

The present computer system and its expert reconciliation system is intended to be used in banking installations where very many, as an example, more than 100,000, checks are processed in a day.

By way of a specific example related to reconciliation, the present computer system, and the programs which implement the process, allow a batch of checks to be balanced (conventional data processing with data based handling); also, in the event a need is recognized (the checks do not balance), the system calls upon an expert system to advise as to a solution to the recognized need (determine what needs to be done to make the check balance), and then performs the solution.

In a banking environment, this requires that the computer and reconciling system, which we have provided with prebalancing procedural modules, user interface modules for reconciliation, and the database information which is shared by conventional and expert processing which we have provided and enabled to operate in a multi-tasking, distributed, multiprocessor environment, with an expert module to process information in the background along with the prebalancing operations necessary to provide an effective reconciliation process. This has been done so that prebalancing and expert solution answers to problems recognized can be displayed to an operator, and so that the operator and conventional data processing operations can use them. In addition, the system allows for further processing steps, and/or a verification of the expert solution answers, and/or permits a non-acceptance and further processing, either in an expert mode, or in a conventional mode.

The stored control system which includes a breakthrough interface between an application program and an inference engine, which uses a knowledge base of an "expert" reconciler described herein, is applicable to other "expert" tasks, and to expert systems in general.

The described system may be described as an active expert system where the system prompts the operator. The system provides the expertise and delivers decisions from that expertise to the operator. The system provides for sharing of a common library system of rules, of computations based on the system rules as present in an expert advisory system. In addition, the system employs and passes information to the rule routines from expert applications rules. In addition, the system provides for conventional data processing, and in addition, the system provides interface kernels, both in the expert module and in the conventional modules of the system, all sharing a public library, whereby calls can be made to one system from another for information, and information shared between the systems.

These system functions are permitted by a conventional data processing system first accessing, by a call routine, the start of an expert application routine, and then passing a value at this time to the expert system, at which time the expert system takes over. The expert system makes a call to the library of rules and knowledge base. When there is a response, the reconciliation process is performed, and the result sent for display, awaiting keyboard instruction (or program instruction) as to whether or not to save. If the answer to save is yes, that value is passed for access by conventional processing. At the end of a block, it asks the operator whether or not (with a boolean) to proceed to a next block. If yes, the expert reconciler proceeds to the next block; if not, the expert reconciler relinquishes control back to conventional processing.

Specifically, the system provides a common database, with alterable memory store buffers. The system provides for an expert rule or frame library. The system provides for a knowledge base of rules and decisions. The system provides for expert actions to be performed. The system provides for a control code for sending and receiving values between a conventional data processing system and an expert system. And the system prompts the operator and delivers the decisions from programmed expertise to the operator for interaction and acceptance, performing expert operations in a background mode.

As will be learned from the full disclosure which follows, the elements which we have created are new and accomplish specific interrelated functions. They employ the help of an expert knowledge base and a control structure provided by a KES or other inference based language system, which interfaces with conventional data processing structures.

It will be recognized that we have described certain elements in the control routine which may be implemented by software which is described in detail. It will also be recognized that such software, when resident, acts as a specific control structure configuring the system to a certain function. However, the present system will enable not only conventional data processing mathematical and procedural logic functions (such as employed by the procedural processes of the procedural modules 213, 215–220, the user interface 212 of the preferred example, as well as the standard application, file and the file transfer and host module database routines illustrated by IPS) but will also enable inferential and heuristic functions to be performed by the inferential engine of KES expert module 211, and also rule based materials and frames to be employed and illustrated or displayed by the system, which may be incorporated in the expert module 211 or in an application module.

In order to accomplish the above, we have invented a new interface system, described by conventional languages. This new interface system allows expert and conventional data processing systems to have their language described elements configured by compiling code written by a programmer, and executed to intercommunicate and perform as master and slave, or as control and sub-task processes.

We have provided computer systems with expert modules which communicate with conventional procedural process controls. We have provided a prebalancing module utilized by the system and operators. We have provided a new user interface module known as a reconciler for use by the system operators. We have provided additional modules for statistical reporting, and printing systems. We have provided a new reconciliation display system enabling reconciler operators to utilize the system with a minimum of learning time, and in a time effective manner.

The apparatus, methods and systems for accomplishing these functions are described in detail in the description. For a short overview of our many inventions and the solutions which we have provided, the reader may refer to the claims and ABSTRACT which follows the claims.

A more detailed understanding of the inventions may be had from a review of the following detailed description of the invention and claims in connection with examples described and the drawings in which:

Figure 6:
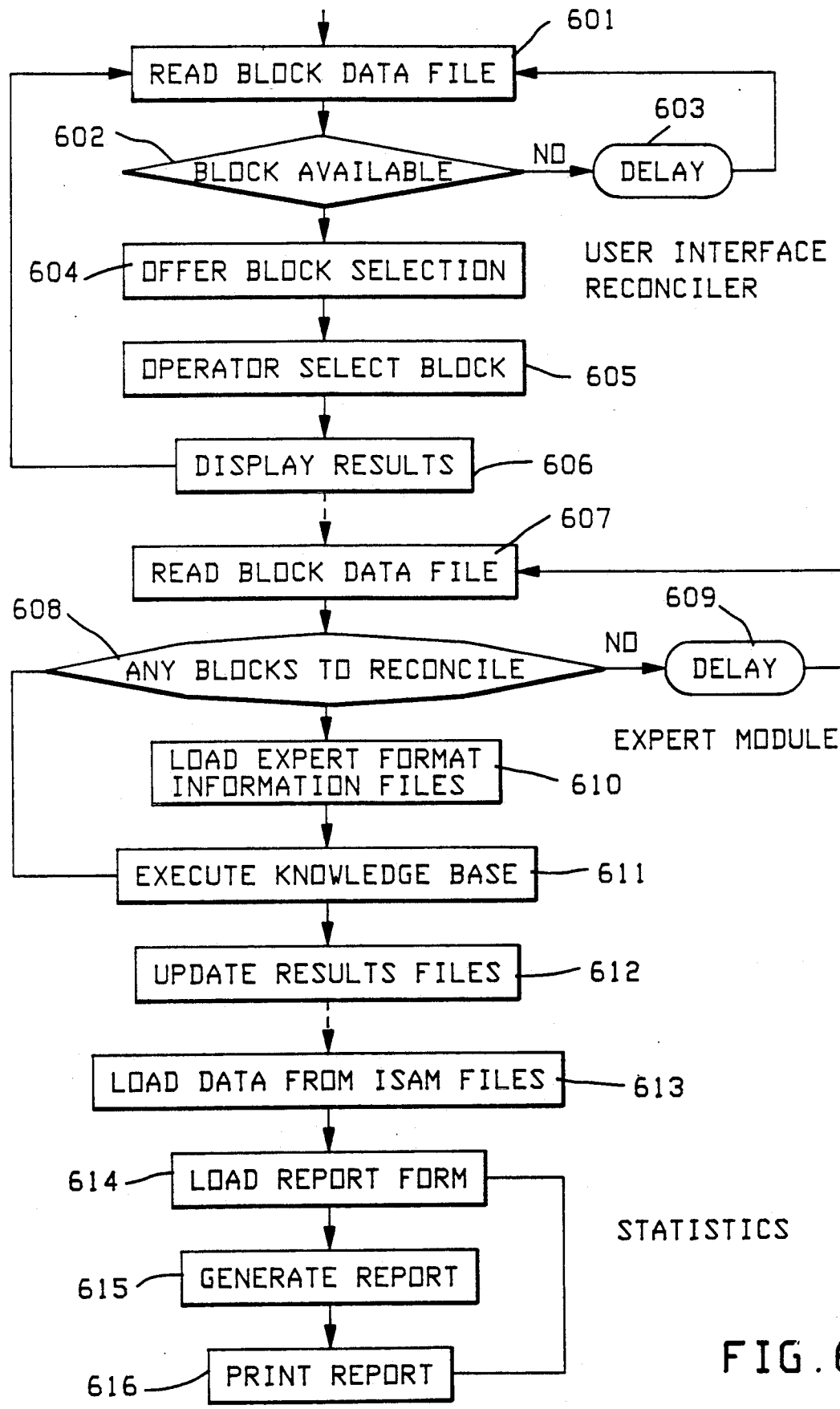

FIG. 6 is a flow diagram which illustrates the interrelationship of the user interface module, which we sometimes refer to herein as the reconciler module, and the expert module. The user interface module, like the prebalancing module, are conventional language modules with the ability to interface to the expert processing module which employs KES or other expert inference and/or heuristic and knowledge based control language along with our additions and interface to KES and the procedural language controls, as described by implementation of the functions for interface illustrated by Examples 1 and 2.

Figure 7A:
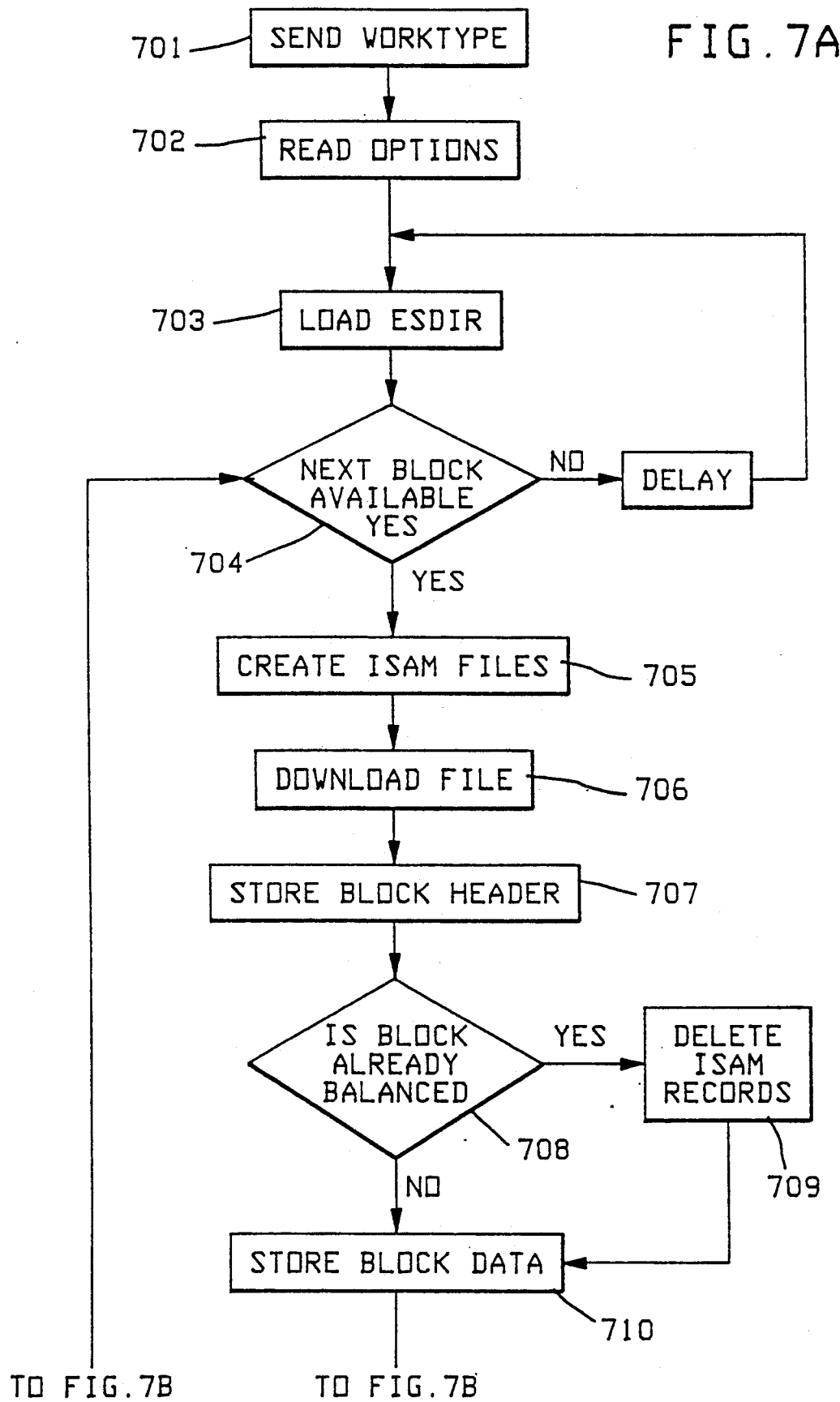

FIGS. 7A and 7B are a flow diagram which shows the structure of operations handled by the prebalancing module.

Figure 8:
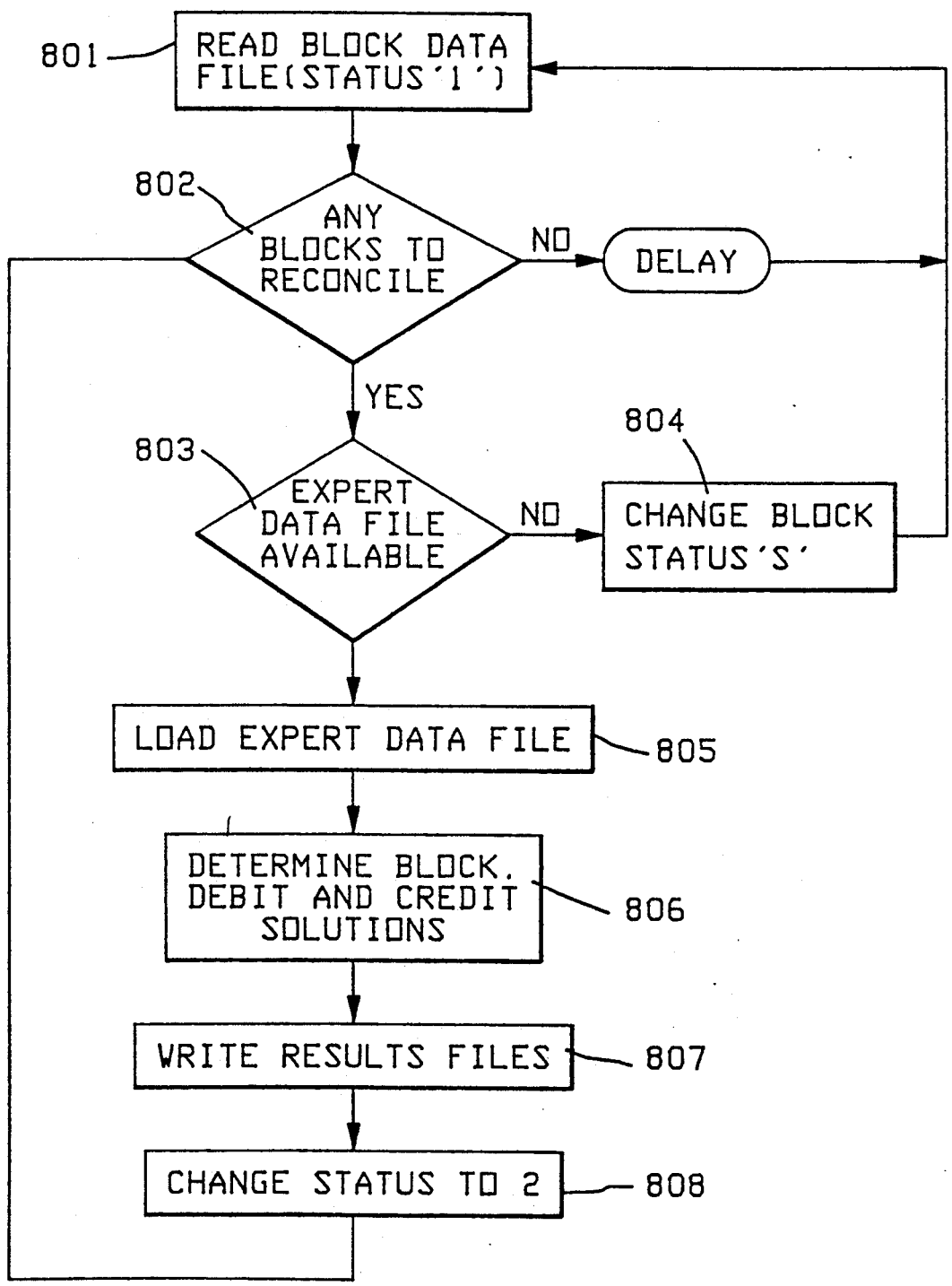

FIG. 8 is a flow diagram of the structure of the expert module.

Figure 9:
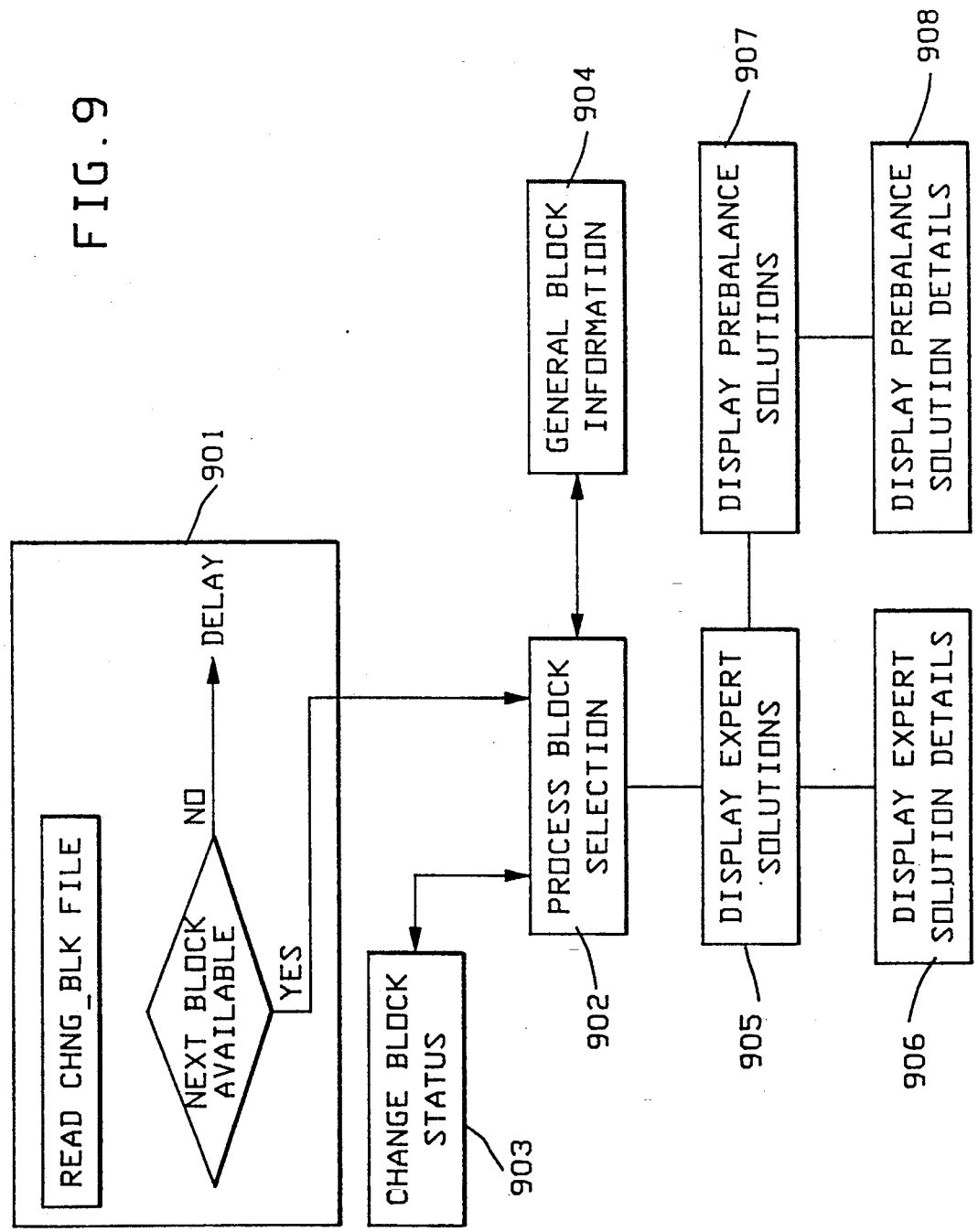

FIG. 9 is a flow diagram which illustrates the user interface reconciler module.

Figure 1:
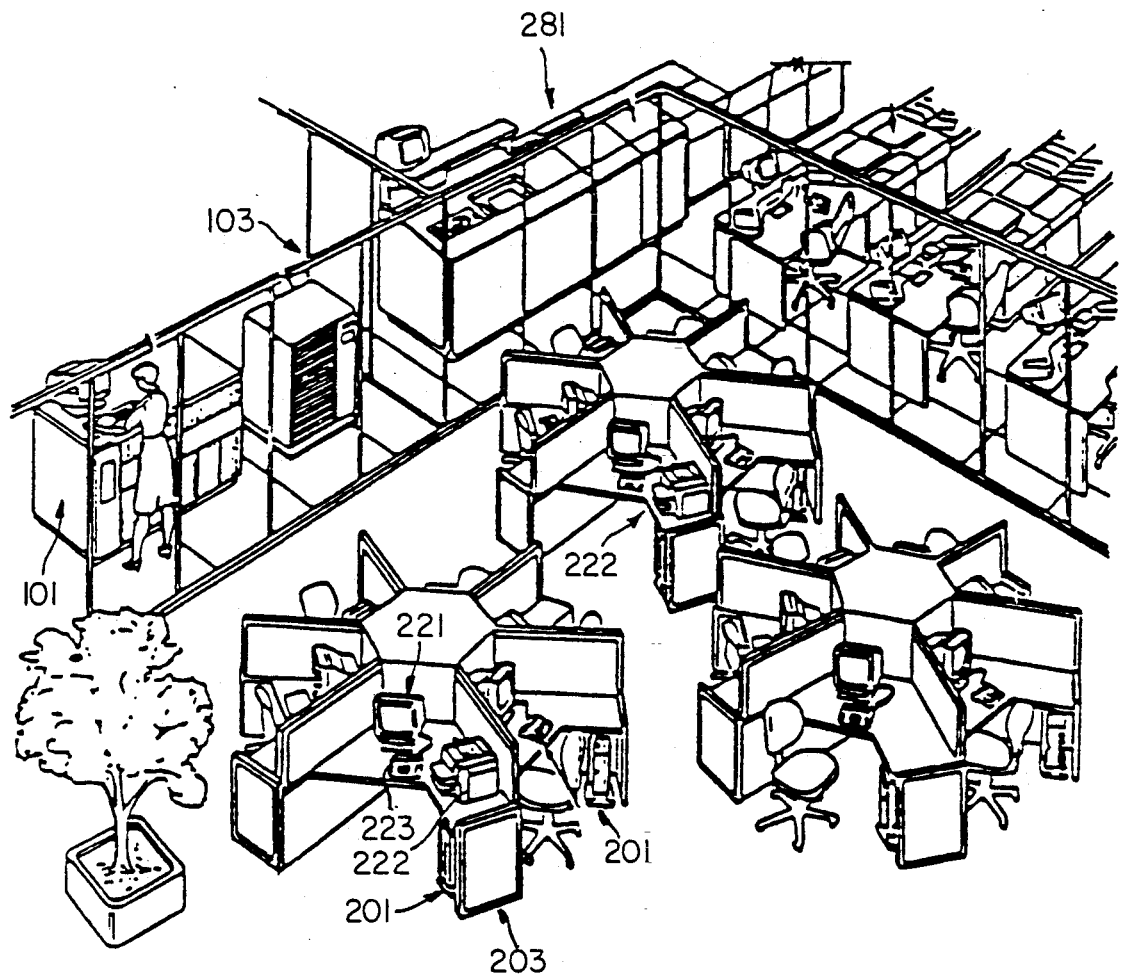
FIG. 1 represents a schematic view of the banking system incorporating the integrated expert platform.
Figure 2:
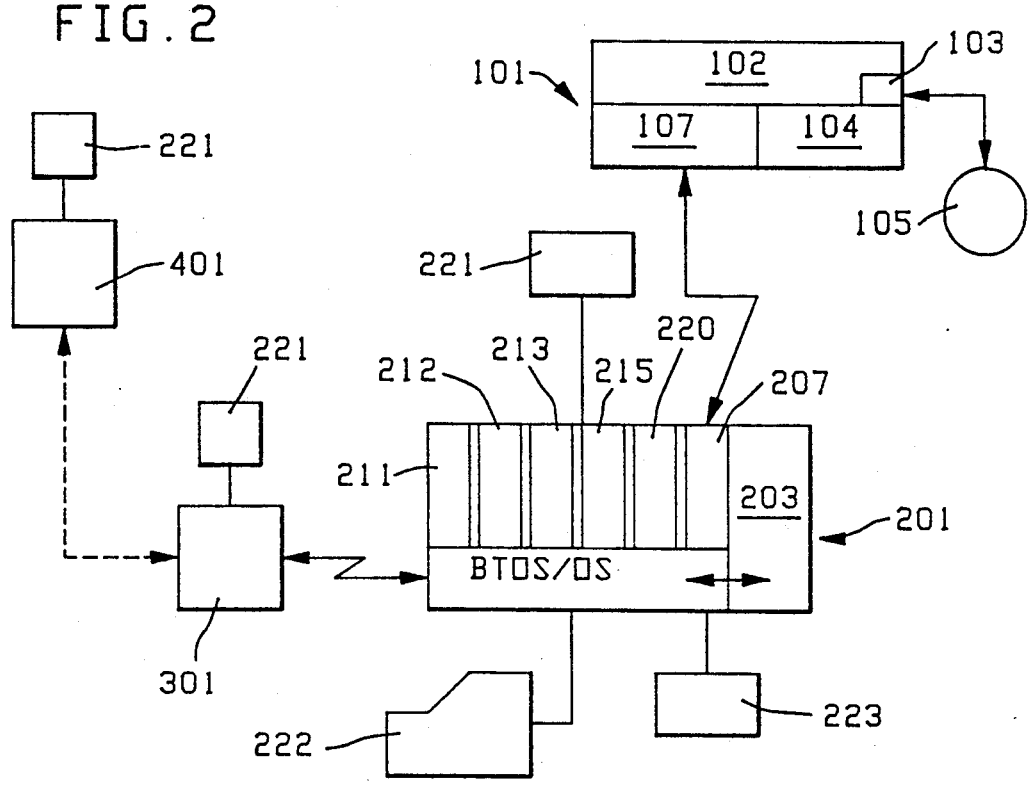
FIG. 2 is a schematic representation of the overall integrated expert platform in a schematic overview.
Figure 3:
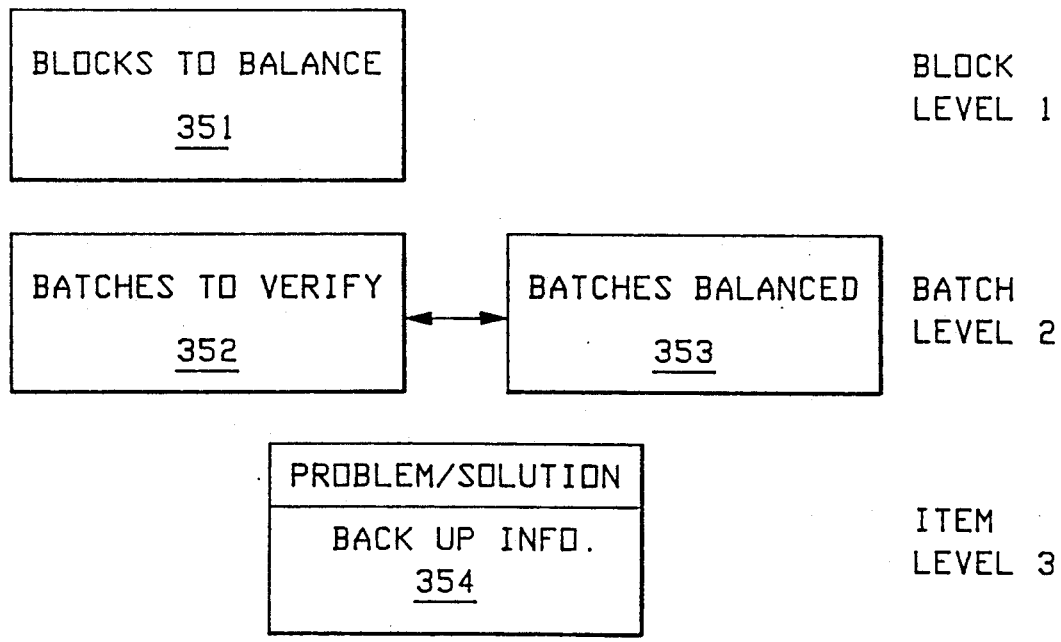
FIG. 3 is a schematic overview of the screen levels of the display of the integrated reconciler display system.
Figures 6, 10:
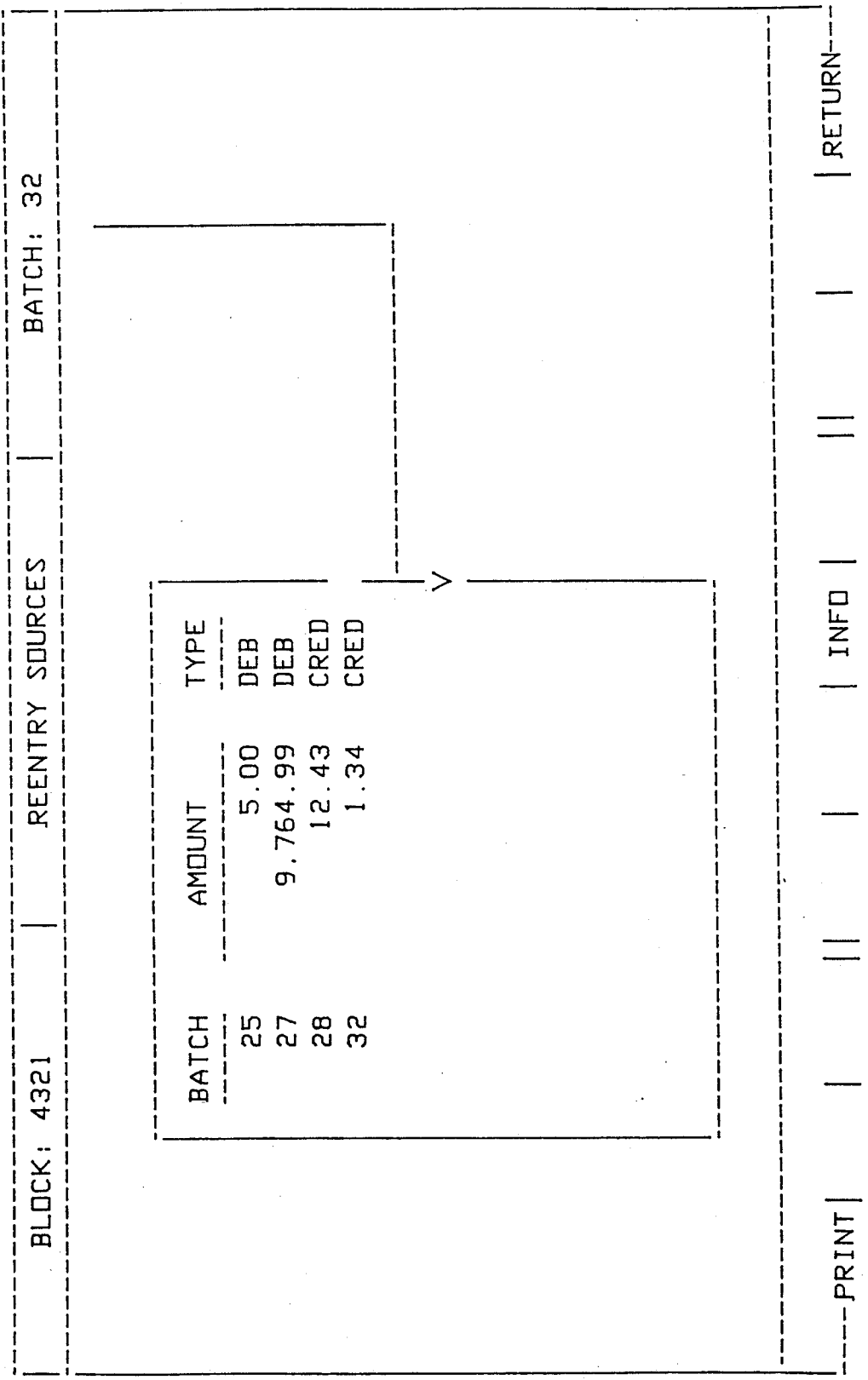

FIGS. 10-1 to 10-12 illustrate specific examples of three levels of screens illustrated by FIG. 3. Specifically, FIG. 10-1 illustrates level 1, the Blocks to Balance screen, while FIG. 10-2 and 10-3 illustrate the primary screens of level 2, the batches to Verify screen being shown by example in FIG. 10-2 and the batches balanced by prebalancing being shown by FIG. 10-3 while FIGS. 10-4 to 10-12 illustrate specific examples of level 3, problem/solution screens.

FIG. 11 illustrates a specific example of the alternative screen which may be accessed by the display of FIG. 3, showing batches balanced and unbalanced.

Figure 12:
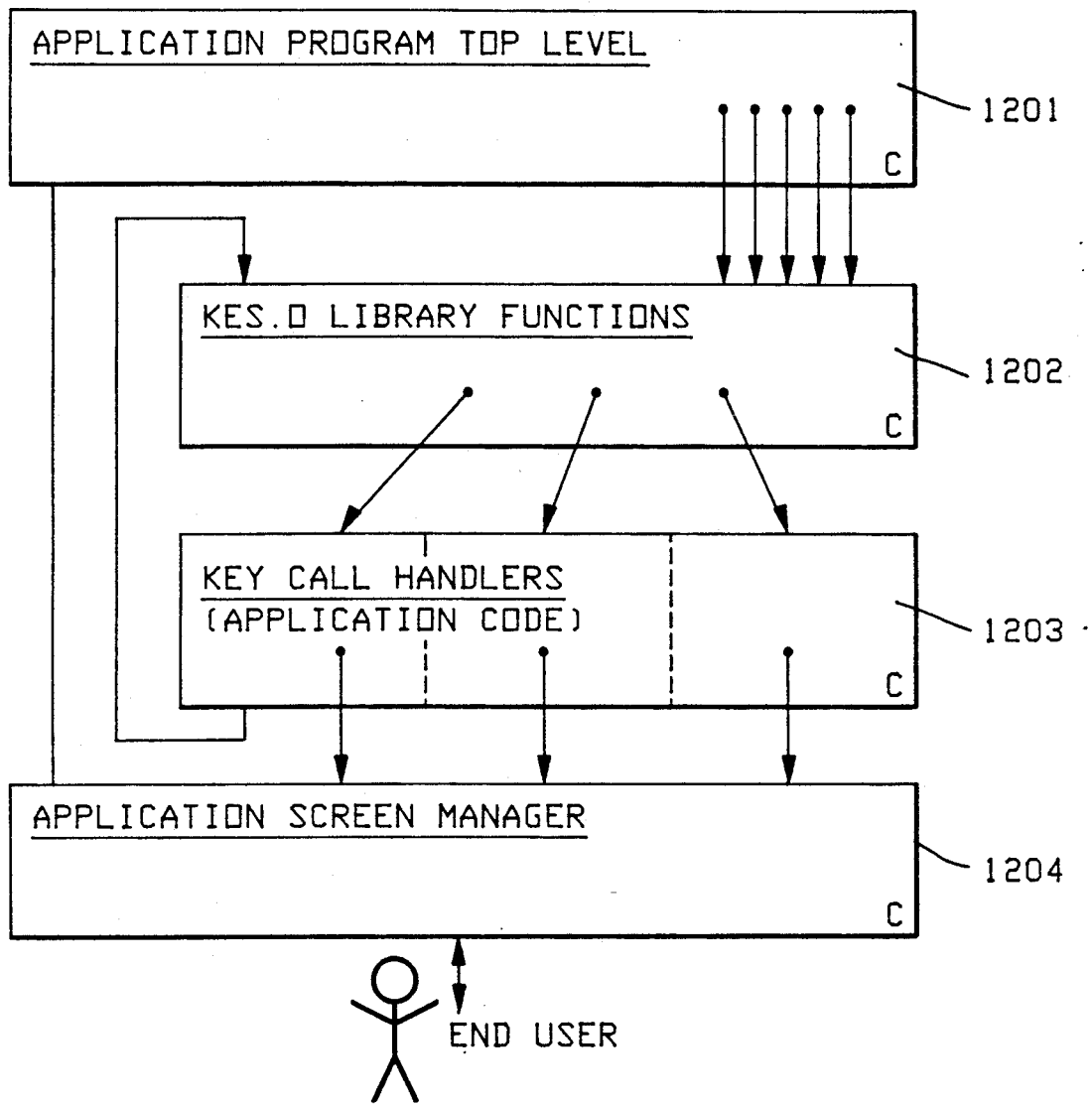
Figure 15:
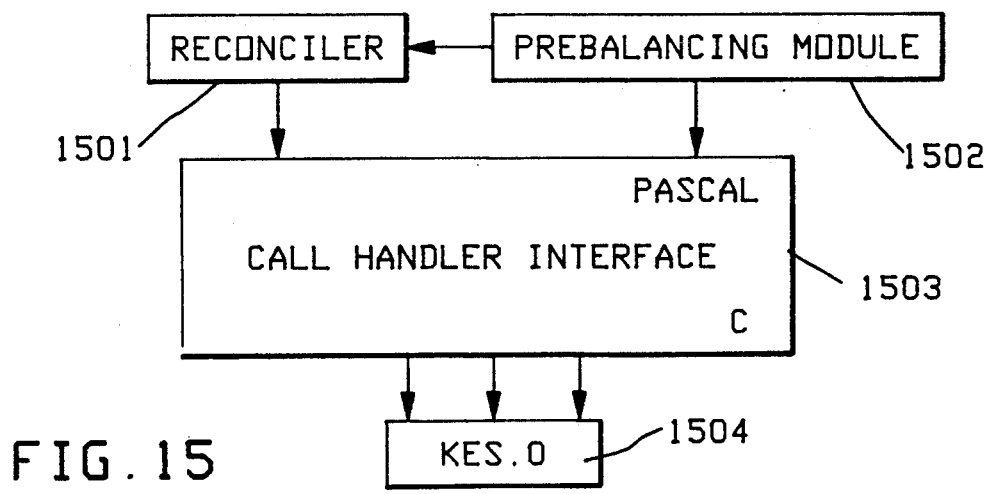
Figure 13:
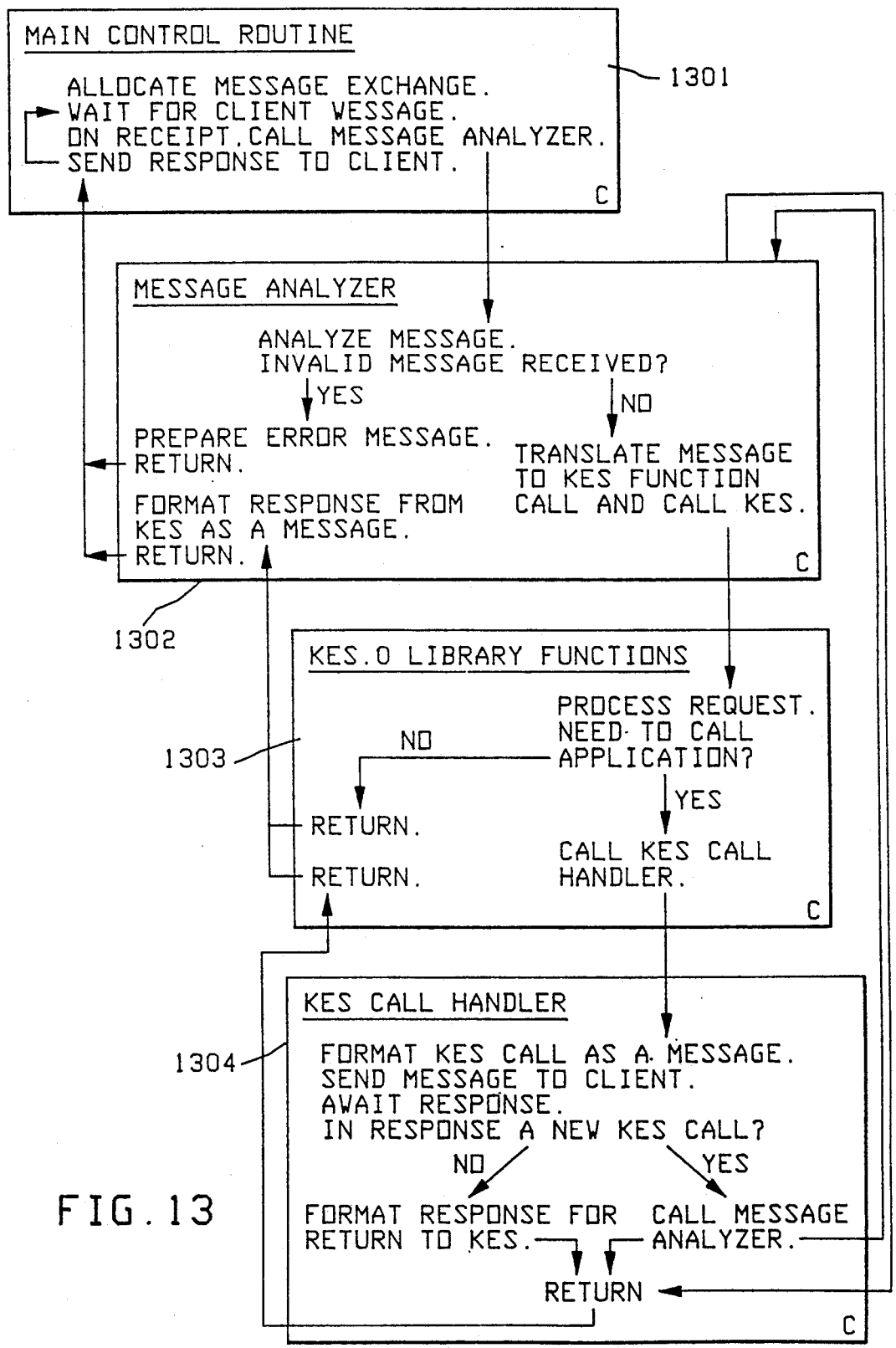
Figure 14:
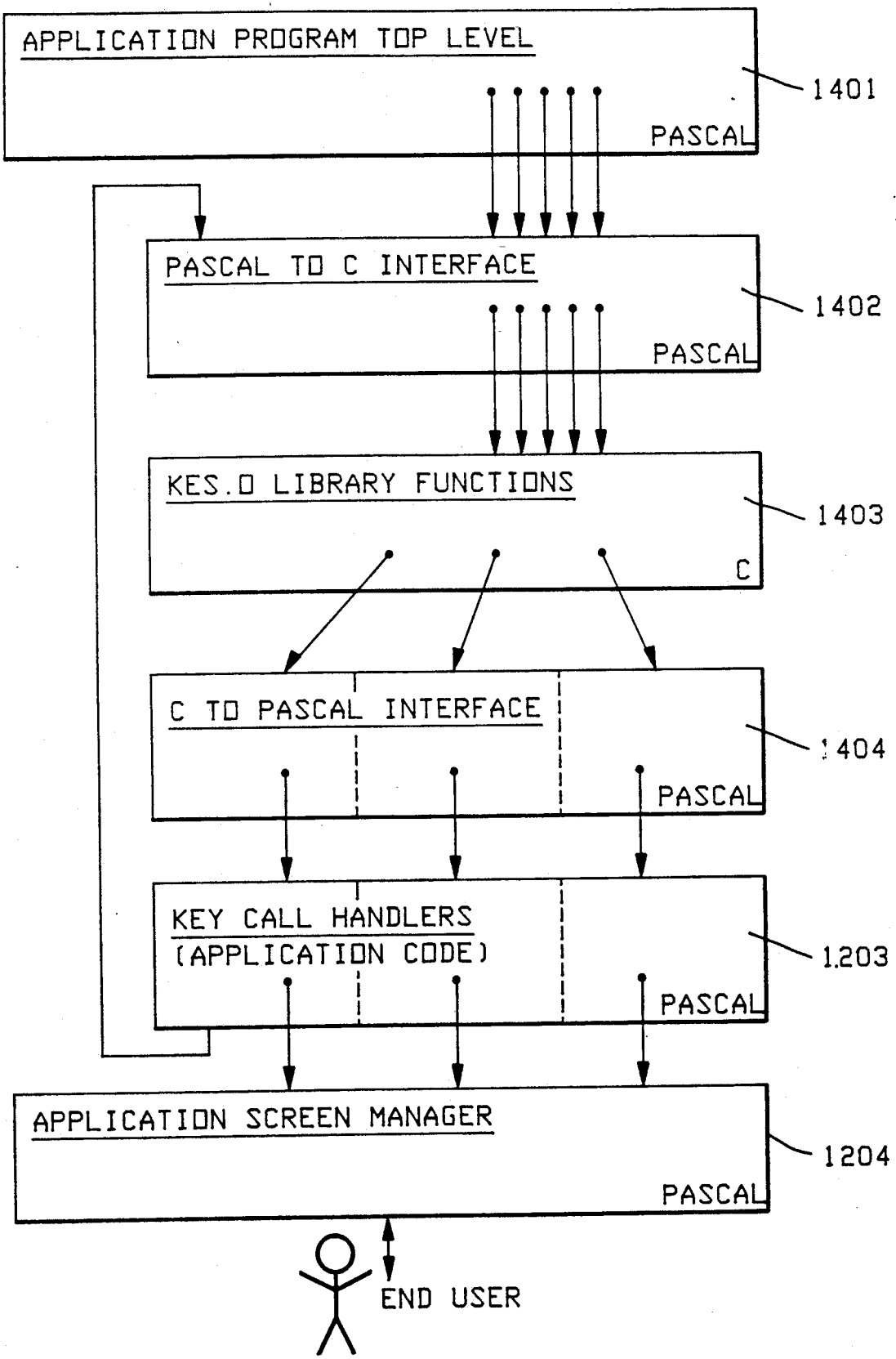

FIGS. 12, 13, 14 and 15 are illustrations of the solutions which we have made to the problem of interfacing user interfaces with expert systems of the kind we describe herein: FIG. 15 and the examples described are our preferred embodiment, FIGS. 12, 13 and 14 are alternative embodiments for embedding an expert knowledge base and inference engine which can be employed upon solving the call handler problem as we have done and described with respect to FIG. 15.

DESCRIPTION OF PREFERRED EMBODIMENTS THE INVENTIONS

Turning now to the drawings in greater detail, it will be seen from FIG. 1, which represents a schematic view of the banking system incorporating the integrated expert platform in a network environment in which the workstations 201 are connected to a Unisys V Series Host 101 (a V310, V340 or V380 incorporating the Unisys Item Processing System level 701 or higher as a standard application). Also included in FIG. 1 is the environment in which Unisys reader sorter functions are provided by a Unisys DP1800 281 in a separate room. The documents which are reconciled are first read by the receiving bank and the information is stored by processing in the system as will be described.

With reference to FIG. 2, the station and other illustrated implementations of the preferred integrated expert system are illustrated generally. Thus, the medium system, illustrated in FIG. 1, is represented by the Unisys V series medium system 101, which includes standard application software 102, a data communication interface 103 interconnecting the host module 104, the standard application software 102 with memory represented by large disk storage 105 which contains information obtained from the system operations prior to the balancing operations. This system also contains a communication link 107 whereby files can be transferred between the standard host application software and the host module 104 (and therefrom to and from memory 105). This file transfer unit is coupled for data communication to a file transfer module 207 of the file server module of the master expert platform module system 201. This master unit can alternatively be, either a B26, a B28 or B38 data processing system server (or alternatively a 80186, 80286 or 80386 processing system server) as illustrated by the unit 201. This master server will have an operating system which is preferably a multi-tasking cluster oriented BTOS operating system, or alternative the Microsoft OS. This operating system established the current active control codes which permit file transfers and data and control communication to be processed within the master server, and the master has control codes which transfer data and control information back and forth between server disk memory 203, which may be provided in the form of a Winchester type disk drive or other alternative large store.

The modules of the expert system platform comprise the KES (expert module) 211 which includes the additions described herein, which allow certain files to be "public" files and certain control structures to be declared as external functions with corresponding internal functions declared for message passing and linking calls to be made with automatic returns between routines established in one or more programmed written and established language controls (compiled and provided as a run time executable control structure which allows concurrent and asynchronous processing of the established routines, and allows sharing of KES library files, C files, procedural routines and interfaces to the conventional procedural module permitting the procedural module(s) to utilize the expert modules routines as subtasks, the user interface 212 (a reconciler user interface procedural control display module with displays illustrated by FIGS. 3, 10 and 11, which allows the operator to communicate with other modules including the prebalancing module, and the expert module), the PASCAL procedural code module 213 (which includes the prebalancing module, and permits communications with the expert module, and the file transfer module 207 (data comm) which communicates with the medium system file transfer module 107, and with other units, either through the cluster network of BTOS or via another network, or via modem. These platform modules can run in any other cluster station and be duplicated there. In addition, the system may have other applications written in, say, "C" or "PASCAL". The master server 201 can be interconnected with I/O control hardware and software to another workstation 301 via a network (a local area network or the network of the B20 series) directly, or indirectly. As illustrated, still another workstation is connected to the system by a data communication (modem)link. Thus workstation 401 connected by data where communication link can be implemented as a B24/B26 unit or alternatively an 80186 based data processing unit represented by "PC's", while workstation 301 connected as part of the network served by the master workstation 201 can be implemented by the B24, B26 or B28 or alternatively by units such as the 80186 or 80286 based data processing units represented by "PC's" and "AT'a" respectively, and master unit can duplicate the systems or be implemented as a B38 or 80386 based data processing system.

As generally illustrated by FIG. 3, the display user interface which includes the controllers necessary to control the screen of the monitor 221, and permits printing on the printer 222, is primarily composed of three screens at three levels which are accessed when the operator at a keyboard 223 (or mouse) sets a select key. The first screen level is a blocks or bundle level with a blocks to balance screen 351 (which illustrates in detail the blocks (bundles) which are to be balanced so that the operator may prioritize processing. The blocks with the greatest discrepancies are illustrated so that the block selection process is not random as it has been in manual system. The second and next level includes two kinds of screens which the operator may access. This second level includes the batches to verify screen 352 and the batches balanced screen 353. The third level includes the problem/solution screens 354. These screens are illustrated with specific examples in FIGS. 10 and 11 described below.

Now, what we have said in the introduction to this detailed description is that in general expert systems are standalone systems. They are advisor systems. In general what you do is interact with those systems. A system like that really requires that you have a standalone processor of some sort. You buildup this expert system as a system of rules, whether it is a rule based or frame based, the point is that when you build up this system you put in the rules which are based upon the expertise of an expert. These rules are why the expert system works so well. You then have a system which a less experienced person can interact with using that expertise or having that to help solve problems. This kind of system is the kind of control system which is implemented in the expert modules of our system illustrated by the Figures therefore, which includes our additions illustrated by the examples and figures described herein below. We have not described the expert rules in detail except for those necessary for practice the inventions claimed herein. It will be understood that the Knowledge Base which is accessed in the expert module may be created for the expert module by detailing the steps that an expert would take, establish the rules in accordance with this detail and the requirements of the inferential and/or heuristic control language (illustrated herein by the preferred KES 2.X) and incorporate these in the library of the KES system, which is then, in accordance with our improvements made accessible to the user and to the procedural modules of the system for overall control. In our system, it is an important improvement that we have provided the elements which permit the expert module to perform sub-tasks for the procedural overall controls. It is within the contemplation that upon understanding the description and examples of the interfaces between the procedural and expert modules (between KES - C and Pascal), the procedural module could also perform sub-tasks for the expert module.

A significant problem with the earlier expert systems which we have overcome is that they are not able to do number crunching, that is numerical processing. They are very slow and consequently very bad for that. In general to date they have not been integrated with conventional data processing. In general they are really standalone expert advisor systems, and thus they advise of the expert knowledge, and sometimes the most likely possibility, but do not directly perform tasks which the operator of the system is expected to do. They create a standalone system like this, they roll it into someone's office and it does the limited advisory job. It is not connected usually to the main frame database, as is the presently described system via the data communication file transfer and data communication modules, with the main frame systems 101 or with the financial structure in general. Sometimes they are integrated with a spreadsheet package, such as Lotus, but in general are standalone systems. Subtraction and number crunching have to be done in the expert system, and that is not the best way to do it, as will now be appreciated.

Most all of business processing is done with conventional data based processing systems, using the languages such as Pascal, C in a workstation and in Cobol on a medium system.

It will now be appreciated that the reconciliation process, when it is implemented as we describe, is an expert system which is advantageously implemented as part of a financial system.

In implementing our inventions we have overcome various problems of expert systems, including their inability or inefficiency of doing computations and their lack of integration. As a consequence, while we have selected and described reconciliation, additional problems which can be solved by experts can not be solved in the manner we describe for reconciliation.

The user will wish to make judicial use of the power of the present system, as the situation requires that the user have a genuine business understanding of the process, as opposed to interest in the new technology. The bottom line is whether it is going to save money. We determined right away that there are many applications which are no good for expert systems.

We have to provide computation capability which can be done by conventional systems, and have some kind of link to a mainframe or medium system to permit sharing databases and other information, while also providing expert processing for accomplishing expert applications using the appropriate tools. We then have to make all of this available with a background processing environment which does not burden an operator. The operator is essentially interested in getting answers which the system must provide. The expert system does the work in real time, as an expert would normally do, and then presents finished answers to the operator. The operator can take these answers and use them immediately. The operator can verify the answers, or can reject them and do the task himself.

The reader will also appreciate that our system does more than provide a Knowledge System which allows a user, even a network user, to retrieve data, as is typical of conventional Knowledge Systems, which are essentially a database system of frames having pictures and words in a distributed system. Such Knowledge Systems provide a common means to assist a user in finding data in accordance with a logical hierarchy, but these systems do not do computations on data, which require operator intervention.

As a differentiater, our system is what we might term an active system, versus a passive system of the prior art.

A passive system is one that is prompted by an operator. Our system is one where the system prompts the operator. In a passive system the operator has the expertise. He initiates entry into the system, asking it questions and steering it, while the system helps steer the operator's thinking in the direction of providing an answer.

Our active system essentially prompts the operator, as opposed to the system prompting the operator. The whole idea is to save the non-expert, from interacting with the system, because the applications which we are attacking are real time applications.

In addition, our active system is a multi-tasking system, a conventional data processing module constituting one task, and an expert system module constituting another task. A file transfer system transfers data between the host and our application, extracting appropriate data from the host and returning appropriate data back to the host.

In other systems available today, such as those with PCs which are not multitasking, conventional processing and expert processing can be performed, but these are done serially.

Our multitasking system, which we call an integrated expert platform, really is a platform of software modules which work together to provide an integrated system capable of concurrently performing expert and conventional processing without the need for operator prompting.

The hardware we have described can be implemented on PCs, with OS2 (which is multitasking, like Unix). Presently, however, we prefer to provide the system using a Unisys B20,B30 workstation having a BTOS multitasking operating system. Multitasking allows the background processing while operators perform normally. BTOS allows timesharing and distributed processing among workstations by using a clustering environment which allows each module which is created to essentially run on any of the workstations within the cluster, thereby permitting all modules to be run on or duplicated on other workstations of the network using such a BTOS cluster implementation and common library and calls of the processes performed, operations will run faster, since several processors will be working on the tasks, as opposed to a single processor.

In implementing our system for use in a financial environment, we have determined that an integrated reconciler will be best implemented by such a system.

For this implementation, the integrated expert platform shown in FIG. 2 is used wherein units 201, 301 and 401 are BTOS workstations (also referred to as servers). Communication link 107 couples these workstations to a V series host module 101 having IPS 701 or higher software. Layered to the operating system are the defined set of modules which communicate between each other and with the operating system directly. These include a user interface, a KES expert language module, a procedural control code, implemented in Pascal, and procedural modules which may be written in C or Pascal depending on the flexibility needed. All operate interactively with the BTOS operating system. All systems have a display console monitor, and the workstations all have a display monitor 221. There is also printing capability within the system provided by at least one printer, 222, which may be coupled to a workstation as illustrated for the master server 201.

Any of the modules can be run on any workstation of the cluster of the system. The master server 201 may be generally differentiated from the others by having a disk so that it can store information; processes can be distributed anyplace within the cluster. In the host 101, there is a communication module, as well as a host module written in COBOL for handling file transfer between modules of the host. Of course the host has a large mass store, as illustrated by the disk 105, and may have other standard host applications resident. The communication link including the communication module in the master server, the communication module in the host and the host module allows the master to communicate with the host, and via the host out to the mass store of the overall system.

As a general summary of FIG. 2, it is important to appreciate that any module can be run in any workstation of the cluster and can be duplicated, and talk back and forth to other workstations of the cluster, and via the host with other clusters (not shown).

After a review of FIGS. 1 and 2, it will be understood how the expert module is integrated into a workstation environment. This is believed to be the first integration of expert systems into a conventional processing environment by having conventional data processing control calls to an expert system embedded therein. This allows the expert to process those elements for which it is called and then return control to the conventional data processing routines. Before, expert systems were generally created using specialized machines, so called LISP machines, named for the language used to process "expert" rules and frames. The machines were so specialized that conventional machines could not interact with the expert system which was resident in the specialized standalone system in the manner we now describe.

With reference to FIGS. 2 and 3 et seq., it will be understood that an expert module can be embedded in an otherwise new but conventional workstation environment.

First of all we established expert rules for reconciliation.

Next we utilized a particular expert language KES which was susceptible to be embedded in other languages.

At the time of our inventions, KES could be embedded in a "C" program to the extent that the application user could write a program in "C" which could be accessed by the KES program. However, at that time, KES was not callable from other processes or languages. PASCAL, which is a language we employ for reconciliation, was not callable from KES, and KES was not callable from PASCAL, (OR "C").

The knowledge of the expert at reconciliation in the event of an out of balance bundle or batch was determined and encoded in the expert module where it is embedded in the KES expert language. These rules can be very heuristic, and KES and other expert languages were created to handle heuristic decision making as their primary task. One of the difficult problems that these decisions could only be communicated to the expert operator, through screen prompts, and required operator intervention for processing.

The world works in Pascal or C, and the data processing world is controlled by conventional data processing, which still control the procedures and the set way that operators do their jobs in most instances. However, conventional data processing elements could not access the expert module. Conventional data processing was not created to handle heuristic decision making.

What we determined was that we needed to make the expert system processings, including the processes particularly suitable for handling inference and heuristic decision making, a part of the overall system, but as a sub-task of the conventional data processing processes, reversing, if you will, the earlier direction of expert systems.

However, the need still existed for a way to integrate the two systems in the desired manner. The expertise of "experts" in conventional data processing, as illustrated by the BTOs operating system offered no help. Indeed, experts in expert systems did not know how to accomplish this task.

However, we developed a code and process for integrating the two systems, and making the expert system processes a sub-task of the conventional systems. These processes create an interface between the conventional processes and the expert inference engine, together with functions for accessing a knowledge base. Once the principle is understood, it can be extended by those skilled in the art to accomplish other functions. As an example, after our invention, an interface for PASCAL will be released (as level 2.5) as a feature of the KES product, with integration based upon the preferred embodiment described herein and by way of examples.

Similarly, KES may have an interface which is callable from "C".

The preferred embodiment of the invention, in the alternative, may be implemented, as an alternative with the KES 2.5 version which is expected to be released at the time of filing of this application, or thereafter. If released, it has according to our understanding employed the teachings of this application at least to some extent. We have only interfaced directly with Software A&E's KES version in the last few months, since it has been revised based upon the requirements of the reconciliation system described herein. The new version will handle integers in the billions instead of in the millions.

In general, when other banks send a bunch of checks, the bank does not trust the other banks' representations on the balance sheet provided, so they put them through their own check sorter, such as illustrated by 281 in FIG. 1. The banks then derive their own list; if they agree, they go ahead and pay off the other banks.

However, we have determined reasons for the occurrence of out of balance conditions, and these are incorporated in the embedded expert system solution. Sometimes the lists don't match or balance, and this may be for a wide variety of reasons. Sometimes, somebody drops a check out of the bundle. In some cases the check went from one bundle to another bundle. In other cases, a check went from one place in the bundle to another place in the bundle and put certain portions out of balance. In other cases, the amount that was encoded on the check was wrong to begin with. The courtesy amount is the number amount written on the check. This is encoded by an in MICR on the bottom of a check along with other bank routing data and an account number. It is possible that when the sorters misread the MICR encoding. This would throw the account out of balance. Customers could have added improperly on a deposit slip as well. All of these type of errors could throw a bundle out of balance, or make the balance lists not match.

The ability to find such problems is an expert task and performed as a sub-task within our integrated reconciler system.

In our system, we split out the problems that should be done by an expert or inferencing or heuristic processing, and those which should be done by conventional data processing. In addition, we determine or try to determine what data was needed in order to do this task. This information or data may be in a workstation or in the host, so the communication portion of the system allows the proper data to be accessed, retrieved, and examined wherever it needs to be processed, and presented to the operator at the workstation.

Before our expert system integration, a reconciler operator would have to go through 20 or 30 blocks of work, and a stack of paper about 15 inches high just to find out which blocks were out of balance. That task had been eliminated.

One of the goals of our system is to keep the number of screens which a reconciler operator has to look at to an absolute minimum. In the preferred embodiment, the operators do their work with only three screens.

A lot of back up information is provided for things that the operator can ask for, which are what we call passive windows. These can be called in case they want to look at other data.

However, the active screens are three. These three screens are illustrated by FIG. 3. The first screen 351 tells an operator all the blocks that are out of balance. These are listed with numbers, showing the amounts out of balance, so that they can attack large blocks first. The first screen allows the operator to identify those immediately. In the former non-expert manual working environment, the operator could only grab a block, of whatever unknown content, off the shelf. He could not know which blocks had which problems, so he couldn't attack them on a priority basis. We give the operator a priority choice on the first screen. As soon as they select which problem to work on, they press a button.

The next screen 351 comes up with all of the problems that the system has found within a selected block of 3000 items. It will be recognized that we use block in the program description for what is often referred to as a bundle in the art, and which typically contains 3000 items. Batches are groups of items within a block. Screen 351 summarizes problem by problem, exactly what the system thinks the problem is for particular batches. Then, if the operator presses one more button, he can see all of the background information for each one of those problems on the third screen 353. That is, if we found an item that was imprinted incorrectly, we located it. Screen 352 will show that there is an item problem with incorrect entry, and the third screen 351 shows actually what the item is. The operator is given all of the information needed for the solution, essentially in three screens.

Thus the first screen 331 in FIG. 3 shows the amounts of balance and amounts of out of balance for each block. The second screen 332 provides a list of each of the out of balance batches in the block, and the likely reasons each is out of balance. This allows the operator to verify if an out of balance has already been solved in the background. The third screen 333 illustrates the particular detail.

Level one in FIG. 3 shows all blocks which are out of balance, the amount of the out of balance, and whether it has been completely solved by the background processing. To get to this "balanced by the system" data, the operator has to press one more screen, but this extra step is normally not used, since the operator usually accepts the expert solution as correct. Typically, about 80% of all the balancing is automatically done in the background.

The expert system is really then able to be devoted to the hard problems to solve, say 20%. When one of these is selected from the problem batch screen, the system shows a summary of the problems identified as well as a suggested solution, with the back up information available on the third screen.

As part of the reconciler system, there is provided a transaction image balancer, which is provided to help balance particular transactions. The work of a bank is made up of a whole bunch of transactions. Most banks now balance to the block level, or batch level. That is even though things are mixed up within the block, as long as the block balances, still adds up to Zero, they are satisfied. However, there is still the problem that if one check got put into the wrong deposit, then two persons, customers, are going to be out of balance. The bank is worried about it, but the block is the most important for between bank reconciliation. They must solve these first.

The image based system, solves transactional problems, and is likewise adaptable to and integrated with the Expert Module, with rules for expertly solving problems at a transaction level. However, the transactional balancing may be separate or combined with the reconciler application. In addition, each of the two systems may be combined with an image system, with display of the actual items under consideration in graphic form. In the preferred embodiment, with the integrated reconciler platform, the transactional problem is a subroutine, which gives a summary of all of the transactions that are out of balance within that batch.

Alternatively, the transactional information is left in the host. These are files which allow for exception problems, which allows the record of jams to be located on sorting. This is a key area for out of order checks or missing checks from the batch (since at jam, a check may be flipped to another batch).

Other areas applicable to the computer system with the integrated expert platform are the areas we call proof. Every transaction within a batch is kept in the database in order to make the block or bundle list. So there is accessible information for transaction accounting. Up to now, nobody has tried to solve those problems. With the image based system where graphic display is made of images of the documents under consideration for proof, the image will be used to help solve those problems.

All of these applications may be understood to be solved within the scope of the more general integrated expert platform which is described in detail with respect to the reconciler application.

Now that the block problems have been solved. The next step is to send corrections back to the host which has a database of all transactions, which is then corrected.

It is within the overall scope of this disclosure that items which in the host are not balanced may be balanced by procedural operations of the type generally disclosed herein. This allows for a host to have the expert balancing system, where the information in the host is balanced. That takes procedural steps, is a mechanical operation not generally requiring additional expert steps, and is not as time consuming, but is now susceptible to be concurrently handled automatically.

First, however, the solutions are displayed. If the operator says that the solutions are okay, then the system automatically corrects the database, leaving an audit trail.

In all of these system operations, the operator can take the solution, or look and verify the solution, or conclude that it doesn't look right and verify it themselves. There is a record of what the reconciler does. The reconciler creates what we call log files, which are created as ISAM files in our system, and the logging is in ISAM files. We do not extract that data at the workstation, but it is directly extracted from the ISAM files and sent into what is called a control file, or audit trail files having a summary of what was done. This allows the corrections to be automatically placed in the general ledger system because there is enough confidence, together with an audit trail, of what was done, so up to the minute ledger results from the work can be had.

We force balance to give an up to the minute at the time, so that there is a correct amount available to management at the time.

The log replaces marks made by the reconcilers on the block files. The log also contains not only what the operator did, but the system recommendations, so that the auditor can compare what was done, and have a path to follow if it was done incorrectly. The ISAM format allows a spreadsheet or word processor to extract that data.

In addition, a variety of reports may be generated by the system.

The described preferred system is intended to be used in installations for 200,000 check a day. The total data reconciling time reduction is about 30% of the time.

Included within the system is a customizer for regional operations and banking particulars. This permit the customer to directly alter the operations provided with the platform, and unique to expert systems.

Generally the customizer allows the change of the system based upon local operating requirements. This allows a predetermined subset of the rules to be changed.

The preferred method of customization is to employ this customization during the "install" cycle. The user is provided with executable code as the expert module. In addition, the user is provided with a customizer module file.

There are two alternative structure to implement the customization without providing the user with source code for the expert system module. The problem with providing source code is that a change in this code which is not controlled could cause errors to occur in the system. Thus the customizer directly alters the executable files.

Preferably, customizing is accomplished employing a program called Customize or Install. An example of such a program used in procedural data processing is the function TPNST of Turbo Pascal. It should be recognized that Turbo Pascal has no means to execute in connection with a subroutine written in another language and does not have a public function. When this program, which may be KESNST is run, it asks for the rules, decisions and other information necessary to customize the alterable files. In our preferred embodiment the specific alterable files are contained in the expert module. By creation of the aforesaid interface between Pascal and KES, through the Pascal and C languages link, which have been compiled and provided in the executable code, the answers to the program as it is run change bytes in the expert module, and fix them for the execution of the reconciliation process. This means that the program does not have to be compiled or linked by the user.

An alternative structure for accomplishing customizing stores the rules which are allowed to be customized a separate data file which can be edited. During installation the user may change the data in the customize file. When the main program starts up, reads this file, and stores the rules in the location within files which the program may access during execution.

Having described the foregoing implementation of the integrated expert platform, and how the structure has been programmed to implement the expert reconciler, it will be useful to explain in greater detail the expert reconciler software and its implementation in the system.

The system includes a group of program modules that run concurrently on the B2x/B3x Unisys series of workstations and provides downloading and reconciling of unbalanced blocks (from bundles) that are generated by the reading software, preferred to be the Unisys Series 701 or higher level software. This software runs on the V series host and generates Rbbbt files for use with the host interface module. The host interface module creates a file with batches that are out of balance in a block. A file is created for each of the blocks that is out of balance. This file is downloaded and used at the workstation for reconciling. After downloading and processing at the workstation, the files at the host corresponding to the block are optionally updated, records are printed and then removed.

Uploading and downloading of files between the host and the workstation is accomplished by the data comm module. This downloads unbalanced blocks from the host and uploads information to the host regarding balanced blocks. The data comm module runs on both the host and the workstation.

In addition, the workstation cluster is provided with a prebalancing module which initiates the downloading of unbalanced blocks, processes these blocks and then generates appropriate files for the reconciler module and the expert module. At the end of processing a block, the prebalancing module, which is a conventional processing module, sends out an acknowledgement to the host on the block numbers that have been processed so that the host files associated with that block number can be updated and deleted if desired.

In addition there is provided the expert module which permits a separate task to run concurrently with the rest of the system under main system control. It contains the Knowledge Base, the rules which an experienced reconciler would use to reconcile blocks. The prebalancing module of the conventional processing structure makes an entry into the file after it processes a block to indicate that the block is ready for the expert module. As the expert module operates as a sub-task in the background, it reads that file to obtain the next block to reconcile. The expert module runs on the workstation.

The reconciler module is provided as a user interface to the results of the balancing done by the prebalancing module and the expert module, and displays the results to the operator for approval and control by the operator. Examples of the reconciler module displays will be provided.

The customizer module allows an installation to modify the expert reconciler system in the manner which has been described so that it more closely matches the methodologies currently used by their own internal operations, and so as to conform to regional specifications.

In addition, the system is provided with a statistics module which keeps track of information that can be used for generating statistics on the types of work that are going through the expert reconciler and on the performance of the individual expert reconcilers.

The host interface module comprises two modules. The first modules determines whether a block is out of balance. If it is, that module formats the block data generated into files that are downloaded to the workstation. If a block is not out of balance, this module uses the data for statistical reporting.

The second host module updates the host files and removes the formatted files from the host when the station has indicated that reconciling has been concluded for these blocks. This module is run, in addition to any updating, whenever the host requires maintenance.

Figure 4:
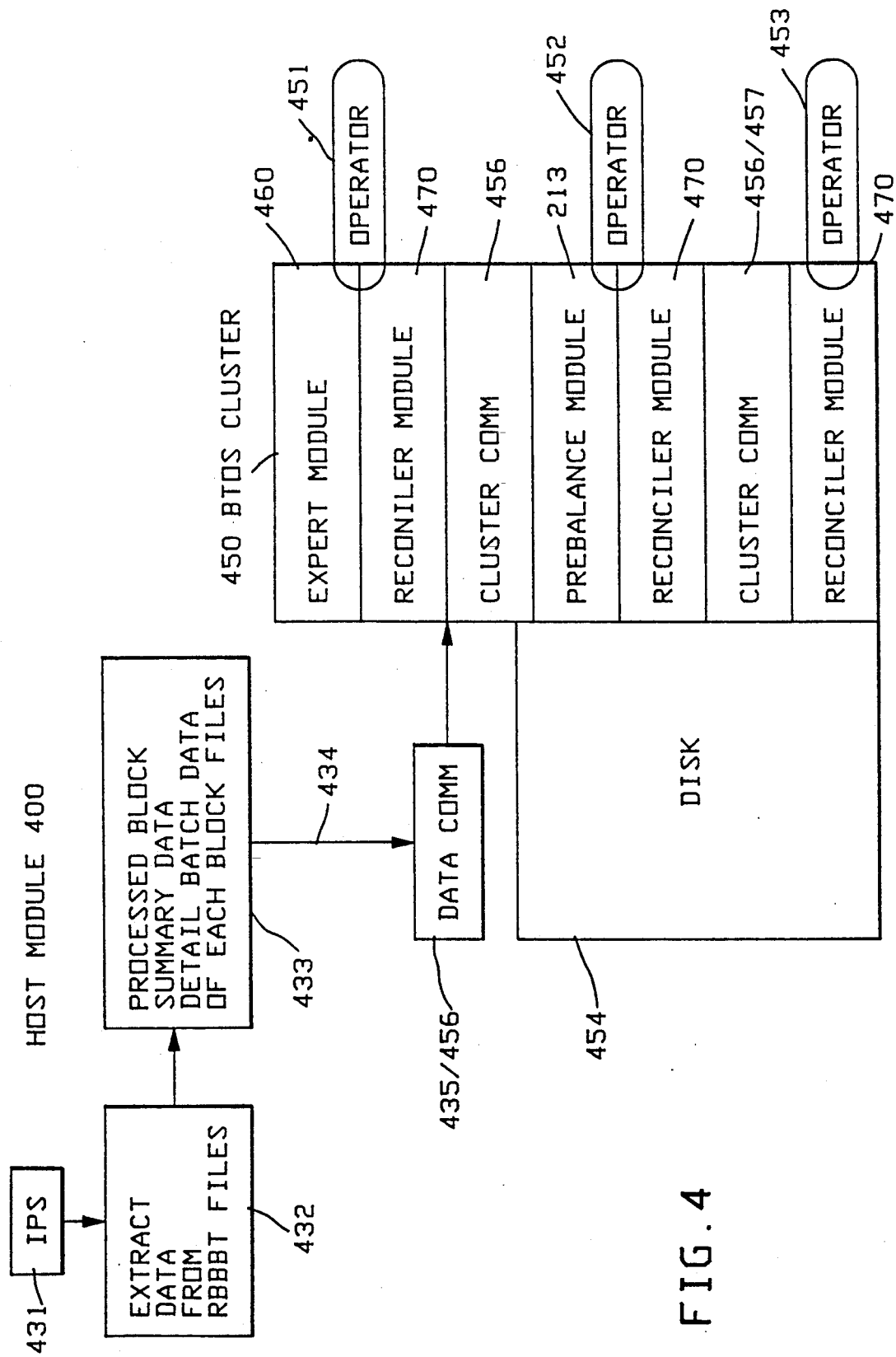
FIG. 4 illustrates the overall configuration and data flow between the host and expert reconciler in a multiple workstation environment.

FIG. 4 illustrates the overall configuration and data flow between the host expert reconciler in a multiple workstation environment.

As illustrated, the host 400 reads data 431 and extracts 432 from Rbbbt files, in the manner provided by IPS 701 and then processes 433 block summary data and detailed batch data of each block are prepared as files for data communication by the file transfer module, and passed 434 to the data comm 435 module of the host 400.

The workstation cluster configuration 450 generally includes a master server workstation 451, a secondary workstation 452 and an auxiliary workstation 453. All can communicate with a master disk store 454, and each are provided with an operator display and printing 455 console for display, corrections and reports (which may also be printed. The primary master server workstation 451 includes a data comm module, which down loads block 456 data files from the host 400, the expert module 460 and reconciler module 470. Various workstations of the unit will have their own cluster comm hardware elements 456, and optional modems 457 for remote out of cluster configurations (the remote is not shown, but is otherwise similar to the primary or secondary workstations, and will have its own disk. It will be noted that the data comm and prebalance modules are not necessary for all workstations.

Figure 5:
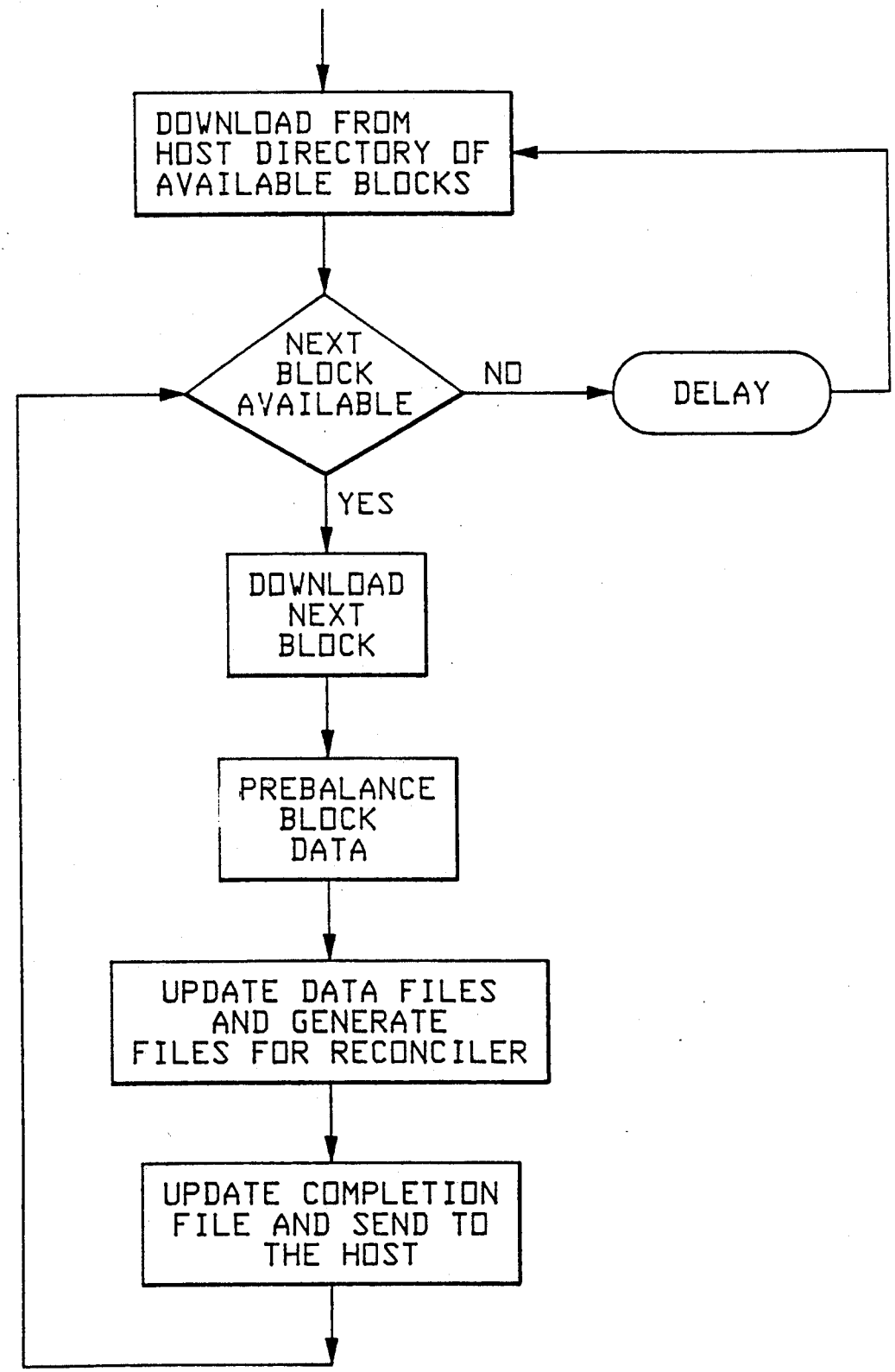
FIG. 5 is a flow diagram which illustrates the flow of information and processes performed for downloading and prebalancing in each workstation cluster incorporated in the procedural control module which implements the prebalancing module of the system, and the file transfer module which accomplishes the downloading.

The flow diagram illustrated in FIG. 5 illustrates the flow of information and processes performed for downloading and prebalancing in each workstation cluster. This figure illustrates an overview of the file transfer module and the prebalancing module. The prebalancing module is described in greater detail below.

The first step of the process is to down load from the host a directory of available blocks. The data comm module is in a waiting mode, and if the next block is available proceeds to cause downloading of the necessary block to the prebalancing module. If not there is a delay, and the download process tries again after a preset delay period. After receiving a file from the data comm module, the prebalancing module prebalances block data, and then updates files and generates the files which are susceptible for further operations by the reconciler and expert modules. Upon completion of those sub-tasks, the prebalancing module updates a completion file and sends that file back to the data comm module and through that module to the host.

FIG. 6 illustrates the interrelationship of the user interface reconciler module and the expert module. The user interface reconciler module, like the prebalancing module, are conventional language modules with the ability to interface to the expert processing module as described by implementation of the functions for interface illustrated by Examples 1 and 2.

Both the user interface reconciler module and the expert module run concurrently, and interface to each other. As illustrated in FIG. 6, the reconciler module has a control step (Read Block Data File) 601 which reads available block data files. It determines whether or not a block is available, and sets a control switch 602 accordingly. If a block is not available, a delay is provided via delay control 603 for a short period, and then the read loop is restarted. If a block is available, the reconciler proceeds to control step 604 and offers block selection (with priority suggestions) to the operator at the display/printer operator interface, and the operator selects (at reconciler selection control step 605 illustrated by the key controls described below) the block to be reconciled. The operations of reading block data files is common to the expert and reconciler modules, and initiated by the reconciler. As the blocks under consideration are stored in a public access store, they are available to both the expert and the reconciler modules, as well as the prebalancing module, and the active blocks are stored in an ISAM file. When the reconciler offers block selection for reconciliation, that initiates a loop cycle 608 in the expert module which tests whether there are any blocks to reconcile. If no, either by operator control, lack of satisfied criteria, or by time delay for operator input, the expert module provides a delay 609. If the operator has selected a block (when there are read block data files as determined by the expert module step 607) the expert module loads expert information files as illustrated at step 610. The expert module then executes the knowledge base at step 611, updates a results file 612, and displays the results at step 606, asking whether or not there is another block to process. The display results file (a reconciler function) asks for operator input. After operator input, the expert module updates the results file and returns to look for any blocks to reconcile. If operator input has answered yes, the expert loop continues. When results are displayed by the reconciler module, they may also be printed along with reports by the display console printer. If "yes", the statistics module may select a report from the ISAM file, step 613, load it, step 614, generate a report, step 615, and print the report, step 616, using printer 222 (FIG. 2). The statistics module then returns to the wait state. When the print and display results are complete, the reconciler module returns to read the next block data file. The operator can also print any screen on the printer 222.

It will be noted that the prebalancing module illustrated in detail in FIG. 7, written in Pascal, runs in the background. It manages the availability and the downloading of blocks, prebalances the blocks and generates the appropriate files for the user interface reconciler modules and expert modules. It then initiates the upload of a directory file containing the number of blocks that are balanced.

As background modules, both the prebalancing and expert modules are standalone modules with no hard link between them. However, they both share a common file to which prebalancing writes out the blocks that are prebalanced and the expert module reads from that file to obtain the next block to be processed. It is the prebalancing files which communicates with the data comm under supervision of the file transfer module and BTOS cluster manage.

There, the first step of the prebalancing structure illustrated by FIG. 7 is the function control (send Worktype 701) which is a start-up that uploads a resident workstation file created by the user through using the Customizer. (If not customized, it uploads the standard file.) This file contains the pack name on the host, job numbers for the institutions all-debit job, and job numbers that the institution does not want to process through expert reconciliation. This file is used by the expert reconciler host module to determine what blocks to process, and what pack (bundle name) to find the data in.

The next step (Read Options 702) of the prebalancing module reads the file (Xoptions, log) created by the start command, allowing under option 1 the expert reconciler system to download all blocks in the directory starting at the first block. The second option will ignore all blocks in the directory file and start downloading or processing from the next block onwards. The option selected is entered in the log file for audit purposes that the prebalance module reads.

The next step (LOAD ESDIR 703) initiates download of the directory file from the host which contains the names of the blocks that are available at the host for processing.

Steps 704 and 706 are initiated once the ESDIR directory file has been loaded, and it is read to check if the next block to download is available at the host.

Steps 705 is employed during the download process, and its function is determined partly dependent upon which option is selected (which block to start reading) which occurred during step 704. A set of files are created which we call ISAM file related to a batch of blocks. This is the active file use and updated during subsequent processing.

Then step 707 stores the block header for the block from the downloaded file.

Steps 708, 709, 710 verify the block existence, check whether it has been already balanced, and deletes ISAM records that have been balanced.

Step 711 is a switch, which determines the job type (block ticket) of the block data received by the host. These job types include particularly an all debit only block and a point of deposit block. If the type is the all debit only, then the block credit difference amount and all batch credit different amounts are set to zero. Then a verification is made to determine if the block ticket is used or not for that block. The block difference amounts (credit and debit) are checked against the total of all batch credit and debit difference amounts, and if they are not the sam the block ticket is used. This information is written to the ISAM file for use by the reconciler module to display to the user for selection, and the process continues to step 713.

However, if the block ticket is not used, the adjust ticket reentered step 712 is employed. This step includes testing for several conditions. The first step is to look at the reentry history for batches where a batch ticket is reentered. For each set of prime and reentry ticket items (those items where the prime ticket amount is greater than zero) the three conditions are checked. The first condition is a comparison of the reentered ticket amount with the ticket amount of batches that follow the ticket reentered batch. If a match is found, then this condition is satisfied. The second condition is a comparison of the prime ticket amount with the prime debit or debit total, or prime credit or credit total amount of all of the batches. If a match is found, then this condition is satisfied. The third condition is a determination if the absolute value of the difference between the prime ticket amount and the total debit amount is less than the absolute value of the difference between the reentered ticket amount and the total debit amount then this condition is satisfied. The condition is also satisfied if the above formula is applied with credit total amount instead of debit total amount. If any condition is satisfied, then the ticket amount of the batch, where the match is found, is replaced with the prime ticket amount. The credit and debit difference amounts for the batch are refigured and credit and debit status are updated. The block ticket amount block credit and debit difference amounts are refigured and block credit and debit status are updated. This step thus corrects some of the sorting machine mismatches of the reentered ticket.

The next structure 713a step invokes the processing of the Free and Missing items from the reentry history. The Free Items are grouped together according to which Batch they were merged into. Taking each group in turn, the Batch where the Free items should be merged is identified. This is done by comparing the Ticket Amount (grouped with the Free Items) with the Ticket Amount of each Batch. If there is no match found, then no further processing is done for this group of Free Items. If a match is found and there are debit free items and the Debit side of the Batch to be merged is not balanced then the Debit Total and Debit Difference Amount of the batch are refigured and the batch debit status is updated.

If there are Credit Free Items in the group and the Credit Side of the batch to be merged is not balanced then the credit free items are introduced into the batch. The credit side of the batch if refigured.

A code line (MICR numbers at the bottom of checks, etc.) matching algorithm is used to match the free and missing items. Each of the free items that is used in the merging process described above is compared with the missing items to identify matching free and missing items. The matching is based on comparing the characters of each of the fields in the code line. A successful match is one where a certain percentage of characters match in each of the fields and this percentage is based on the item processing system's (preferably the Unisys 701) reject codes.

The next step of the process includes the update source reentry structure 713b, where the batch where the Free Items were merged is now identified. This is done by comparing the Batch number in the group of Free items with the Batch number of each batch. If there is no match found, then no further processing for this group of Free Items is done. If a match is found and there are Debit Fee Items in the group and the Debit side of the batch to be merged is not balanced then the debit free items are removed from the batch. The Debit Reentry. Debit Total and Debit Difference Amounts of the batch are refigured and the debit status is updated.

If there are Credit Free Items in the group and the Credit side of the batch to be merged is not balanced then the Credit free Items are removed from the batch. The credit side of the batch is refigured.

As a last step of the process related to free and missing items, the structure 713c performed the step of matching of the rejected reentry items. Each of the free items that is not used in step 704 is subjected to the code line matching test. If a free item matches with the missing item, then the free item amount is added to the batch where the item is missing and removed from the batch where it is free. If the item is a debit item, then Debit Reentry. Debit Total and Debit Difference Amounts of the two batches are refigured and the debit status of updated. If the item is a credit item, then credit side of the batches is refigured.

The next step of the prebalancing process is the structure 714 for identification of multi-batch transactions. A multi-batch transaction may be defined as a group of contiguous batches where a credit is read in the first batch (credit total amount greater than zero) followed by the ones where the credit is not read (credit total amount is zero). This process continues until all the batches are exhausted. Both credit read first condition and credit read last condition as processed. This condition is normally set by the user through the Customizer.

The next step of the process is the structure 715 for the debit side of a transaction. There are two processes for accomplishing this. The first one (SWITCHED BATCH TICKET) looks for a batch Debit status of over/short within a transaction. If it finds one then the Ticket Amount of this batch is compared with the Debit Total Amount of other Batches in the same transaction whose Debit Status is short/over. If a match is found then adjustments take place since batch tickets were mixed up. The Ticket amounts of the two batches are swapped. The debit difference amounts and the debit status of the batches are refigured.

The other part (COMPENSATE UNBALANCED DEBITS) of this process has two parts. The first subpart compares the debit difference amount of a batch whose status is over with all other batches whose status is short. If the debit difference amounts of the two batches are the same with nonzero cents, then status of the batches are made balanced. The second subpart compares the total of all Debit differences with a status of "over" of the batches to the total of all Debit differences with a status of "short" of the batches within a transaction. If this matches and the cents part of both these amounts are non zero or if the cents part of the amounts are zero with the individual items having non zero cents, then the status of the debit side of batches within the transactions is determined and changed to "Balanced."

The next structure 716 of the process (Credit Side of Transaction) processes the credit side of the transaction. The function performed is to subtract the Credit Difference Amount of each Batch having the credit status of "short" from the Credit Difference Amount of the first batch (whose credit status is "over") of the transaction. The Credit Difference Amount of the first batch is adjusted and the Credit Status changed accordingly to "Balanced", over or short. The Credit status of each batch within the transaction is changed to Balanced. The process continues for each transaction.

The next structure 717 of the process (RELATIONSHIP ROUTINE) puts through items and identifies groups of batches which possibly switch (add up to zero). The credit and difference amounts of the batches that are out of balance are put through this process. The first step is to look for a batch or two batches that make up the difference between block debit and credit differences. Then a combination of credit and debit difference amounts is identified that add up to zero. The combination cannot exceed a total of four batches. This information is then displayed to the operator to further assist in the reconciling process. The expert module does not use this information.

The next structure 718 (CHECK REENTRY ITEMS) of the process is performed for all batches that are out of balance. If the credit/debit status of a batch is over, then free items (that were not used in other procedures of prebalancing) and reentered items that make up the catch credit/debit difference are identified. If not found, then prime and entry items for that batch are looked into for possible misreads. If the credit/debit status of a batch is short, then missing items that make up the batch credit/debit difference are identified. If not found, then prime and reentry items for that batch are looked into for possible misreads. If there is no misread item, then other batches that are out-of-balance are looked into for possible reentered item(s) that make up the difference. This determines that an item is missing in one batch is found in an other batch. No processing of data is performed based on the information. All of this information is passed onto the expert module. In checking reentered times, we prefer to process a total of 25 times for each of the conditions and also a maximum of 3 items are considered to add up to the difference.

The checking reentry completes the prebalancing steps, and the conventional processing through this prebalancing module continues for preparation of files for the expert module.

The next structure 719, 720 (UPDATE FILES) updates the block data file 719 and prepares it for KES 720. This file contains information regarding the Blocks that are downloaded and processed. In prebalancing, an entry is inserted in this file to indicate that the block is downloaded and prebalanced, a test condition that is determined prior to availability to the expert module. all the data files are written out during the course of prebalancing. One of the data files issued as a queue by the expert module to pick up the next block to balance.

The initial status of a block is set to "1". There are two exceptions. The first occurs when there are more than 60 batches within the block. The status becomes 'S'. The second occurs if there are more than 15 batches out of balance after prebalancing, and the block gets a status of 'P'. These status pointers are used by the expert module.

The step of the prebalancing process update file structure 720 writes out the data file that is required by the Expert Module. The contents of this file are in a special format acceptable to KES (and we call this structure .TES). This file contains block information and information about batches that are to be reconciled. The block ticket information is passed to the expert module via a file Vxxx.TES (where xxx is the block number). Also, the debit and credit difference amounts of each unbalanced batch is added and compared with the remaining reject amount for that batch. The result of the comparison is also passed onto the expert module via the "TES" file. all the other information found in the "TES" file are results from prebalancing modules of the cluster.

At this point the Expert Module (at point 803 of the flow described below) will have a file available for its use. The next step of the prebalancing process (UPLOAD FILE TO HOST) 721 passes the updated files to the host which have been successfully downloaded and prebalanced. This process creates a data comm file and, as this file is updated block by block, determines the appropriate time to send the block information to the host, so that the host may delete the block files generated at the host which have already been downloaded and prebalanced.

At this point the process loops to the structure of the expert module.

This module functions as an expert module and in connection with application modules and a user interface module, along with the breakthrough interfaces described in connection with the examples for FIG. 15 and the description of FIGS. 12–15 below provides an expert data processing system which would include a plurality of application modules, files relating to the knowledge base, files relating to a specific application if desired, as representation by the prebalancing module written as procedures and contained in module 213, and as an application module, a reconciler user interface module 212 which may include display control drivers and like display means for driving the display of a monitor console, so that the reconciler user interface file communicates with the expert module, and permits an operator to control and provide information to the expert module. The expert module will contain the KES inference and either the expert module or one of the application modules will contain the knowledge base descriptors. Preferably the knowledge base itself is part of the expert module 211. However, it will be understood that it is a feature of this description of our inventions that expert processing system can be a combined one and made of application modules, an inference engine and a user interface. The expert reconciler system will include an expert module and one or more application modules which can communicate to the control structure of the inference engine, as exemplified by the embedded KES described herein.

In our preferred embodiment the expert module contains rules that a reconciling expert would use to reconcile unbalanced blocks and batches. The module uses KES II expert system language as an embedded KES.O (2.5 equivalent) and runs in a background partition so as to be invisible to a user. The reconciling of the block is performed by this module and all of its results are stored in the ISAM data files, which is used by the reconciler module for user interface display. For a full description of KES II expert system language, the reader may refer to the KES II Reference Manual, which is incorporated herein by reference. However, this language system definition is not necessary for understanding the improvements described herein since it is treated as an element which may be communicated with via the interfaces which we have described.

The expert module has a control structure which causes the application system controls for the expert model to read (at 801) the block status data file and check at switch 802 for a Status '1' in order to determine whether there is a block ready to be processed. If the answer to status 1 is yes, the block is ready to be processed. Processing continues when there are blocks ready for expert processing, otherwise the system delays with a delay sequence structure 803 for a period of time and then the read check 801 is repeated.

The expert application control module, if switch 802 is set yes then determines 804 if there is an expert data file available in the ISAM file as an expert format file at step 804. The process is initiated by Kesstart, which loads the knowledge base and runs action. The expert module determines in the special format .TES data file for the block is available to be loaded. The .TES file contains all data that the expert module needs to 'expert' balance the block. When the Tes file does not exist, a structure 805 is provided for changing the status of the block to 'S' for special, and control returns to the read cycle 801.

However, if the .TES file is available the data is loaded and processing continues with the run action sequence.

The run action sequence may include the loading of the expert data .TES file 806, and the steps for determining block debit and credit solutions 807. After the data is loaded the expert module determines these solutions based on experts' rules by coupling procedures described by the knowledge base, the inference engine, and the .TES data. Block solutions are identified when the problem has to do with the control tickets and the relationship between the debit side and credit side of the batch or block. Debit solutions are identified when the problem only related to the debit side of a batch. Credit solutions are identified when the problem only relates to the credit side of the batch.

Subsequently at structure 808, when processing is complete the results are saved to an ISAM file accessible to an application module, such as the user interface reconciler module and other applications, such as a statistics and reporting module. The data is then retrieved by these applications for delays. This is considered a writing or saving of results, along with the confidence factor relating to these results. Both results and the confidence are saved.

After the results have been saved to the ISAM files, the status structure 809 changes the block status to '2'. This status indicated the block has been through the Expert module and is ready for further review and reconciling, and/or approval of the background solution.

FIG. 9 is a flow diagram which illustrates the user interface reconciler module.

As described therein, the reconciler module at a first structure reads the ISAM file CHNG-BLK.DATA 901 in order to determine if there are any files available for display. This determination is made by a switch structure to determine if the next block is a available. If yes, the process continues to the block selection structure 902, and if no, after a delay of a predetermined period of time the reading cycle 901 repeats.

The first step of the reconciliation is the block selection structure 902, which displays a block to process screen, as illustrated in FIG. 3. This block to process screen enables five possible actions from this screen. All but one depend upon the status of the block. The possible actions are for the operator to change the block status with structure 903, to display a general block information screen 904 or to display expert solution 905. These choices are considered to be the prime or level one options.

The actual display of expert solutions is a level 2 display, and at this level, the procedure allows either the display of the expert solution 905, or alternatively, by pressing of a function key, the display of prebalanced solutions 907.

From level 2, the operator can either cause the display of expert solution details 906 or the display of prebalance solution details 908 at a third level.

The user Change block Status routine enables the user to change the current status of a block. A block with status '1' can never be changed since a block has to go through the expert module processing first. A block with any other status can be changed to a different status.

The user can display the general block information for a selected block. The user can display this information at any time that a work screen which is not a pop-up or help screen is displayed.

When the block status is '2', that indicates that a block has been reconciled by the expert module and is awaiting approval. The user can select this block in order to verify the solutions being given by the expert module are appropriate. The detailed expert information that is displayed for a batch is data supporting the results generated by the Expert module with graphical and numerical illustrations to help the operator.

The user can review the prebalancing operations that were performed for any given block that is displayed on a batches balanced screen. This screen shows the general overview of the prebalancing solutions for the batch within the block. The detailed prebalance information displayed consists of the amounts that were altered for the selected batch during the prebalance operations.

At this point also, the institution may obtain statistics on the operations of the expert reconciler. These reports may be generated and printed by the statistics module (FIG. 6) one of the application general purpose conventional modules present within the system. Any screen may also be printed by pressing a function key. The results are printed on the system's printer, Thus, the expert data processing system within the overall document processing system includes a reconciler user interface module which displays information as to batches to process, batches to verify, and the reconciler user interface module displays problem/solutions provided by said expert module. These problem/solutions provided by said expert module are with respect to data processed by said prebalancing module and the confidence level of a solution is indicated.

The system includes a keyboard with function keys and said reconciler user interface module is responsive to said function keys, which have the same functions regardless of the user interface operations.

As there are provided a plurality of levels of user interface operations performed by said reconciler user interface module, at each level an operator may view screens displaying operations before by said reconciler user interface module and other modules of said system, and user function keys permit the operator to switch levels of operations.

As a further use of the reconciler, client transactional balancing may take place.

With the host module and the file transfer facilities in the workstation 203 and the host 101, via memory communication interface 103, the updated files may be maintained, by communicating data bidirectionally external to said data processing system which contains the reconciler. The reconciler can be customized for the user. This reconciliation customization allows a run time version of the reconciler to be provided to the user, and the user limited facility to alter the reconciler to suit its specific needs. The customizer actually changes the bits of the run time version without the need for recompilation. This customization may include a limited facility for changing the expert module and inference engine and a knowledge base containing information and rules for reconciliation of items processed in a banking system and received by a receiving bank desiring reconciliation of items processed from a sending bank. Thus the expert module may be made to have loaded a specific knowledge base and specialized routines for taking action respecting said knowledge base and said block data in accordance with rules established by an interaction between said knowledge base, the data supplied it, and inference processes established by said expert module and particular to the institution. The reconciler module then has the capability provided by screen display of expert solutions details 806 for determining and displaying an operator debit and credit solutions respecting unbalanced data provided for processing by said expert module based upon expert established rules and the expert processing module. As these solutions are written and saved in a block data file, the results of its processing in reaching solutions to an unbalanced item problem may be displayed along with confidence factors relating to such solutions.

As a result of the described structure, a reconciler module uses as a sub-task of its operations the expert module, and it is the interaction of the reconciler module and the expert module interaction which provides expert reconciliation solutions for a user. The expert module action comes after prebalancing and prior to operator acceptance or solution.

The user interface provides the actual human operator with a computer calculated determination and display of processed data information relating to information processed by said processor modules and relating to specific blocks and batch information of said banking system. This user interface reconciler provides data to the control drivers and monitor for displaying of blocks to balance and for offering process block selection options, including changing the block status, and general block information, and also identifying batches to verify, expert solutions and batches balanced and prebalance solutions. Optionally, the reconciler module also provides expert problem/solution detail, or, at operator selection, prebalance solution detail. All of this information is made available by use of a common data file temporary store for files relating to data processed by the prebalancing module and the expert module so that the data displayed to a user is provided from said temporary file store, and there is economy of storage facility used during the processing of data. This utilization of a common temporary ISAM store is made possible by means of the interface between the expert module and the conventional processing modules so that the particular advantages of data based processing of conventional processing modules can be utilized at the same time that the inference engine of the expert module and its knowledge base are used. This is accomplished without the need of rewriting in the entirety all of the procedures and control code for a banks system, and the banking system in general.

The expert reconciler interface allows both the new prebalancing and expert processing steps to occur in the background of a reconciliation process and the user may approve or disapprove of any solutions to a balancing problem suggested by said prebalancing and expert processing steps. The display screens of FIG. 10 et seq. enable a user to select a block with a predefined status that indicates that a block has been reconciled by an expert module operating in the background and which is awaiting operator approval, and enables the user to select a expert module reconciled block to verify that the expert solution is appropriate, along with display of details of an expert module problem and its apparent solution. The particular displays indicate relative importance of difference of amount for a plurality of blocks to process and blocks to verify to a user, and the function key selection enables a user to process blocks and batches of a block in an order determined by the user. The detailed prebalanced screen displays detailed prebalance information relating to batches and displays amounts that were altered for a selected batch during the processes performed by the prebalancing module of the system. The expert detail displays information relating to the expert solution and proposed alteration of data for a selected batch upon acceptance of the expert processing solution and also displays a confidence level for that solution. Detailed examples of these displays are described hereinbelow.

Now with reference to FIG. 3, and FIGS. 9, 10 (all parts) and 11, the workstations all have operator console display monitors, and optionally individual or common cluster printers. The number of screens and keys is kept to a minimum so as to enable an operator to learn and use the system more efficiently.

As a part of the improvements used in the display option, the meaning of a key is kept consistent. Thus one key always means print the screen, no matter what task is being performed. While it is within the scope of this disclosure to vary from place to place the individual meaning of a key, the commonly used keys are a Select Key which when pressed at any balancing screen causes the next level of information (of the three levels) to be displayed for the indicated block or batch. There is the Print Screen key which causes the system to write the current screen image to the printer specified in the configuration file. There are also pop-up screen of general information. Accordingly one General Information key is used to access these areas. There is a Return Key which returns control from the current screen to the previous screen (the reverse direction form the Select Key). And there is a help key which causes the screen to describe all of the currently active functions.

FIG. 3 illustrates the three levels of screen, and FIG. 9 illustrates the hierarchy of the screens. Certain screens there illustrated have a Go key. This keys function is to determine whether or not the operator's identification for that level is valid, and if so to proceed to that screen.

With reference to FIG. 10, this figure has many parts. The first illustrated by FIG. 10-1 is a specific example of Blocks to Balance screen 351, level 1 of FIG. 3.

With reference to FIG. 10-2, this illustrates a specific example of FIG. 3, level 2, screen 352, the Batches to Verify screen.

FIG. 10-3 illustrates a Batches Balanced Screen, corresponding to level two screen 353 of FIG. 3. This screen indicates to the operator which prebalance operations have been performed on a particular batch. The operator may scroll through the list of batches and their solutions.

With reference to FIG. 10, the Problem/Solution screen are illustrated in FIGS. 10-4 to 10-12 as specific examples which displayed whenever a user presses to Go key in the Batches to Verify Screen or a Relations Screen of level 2 and selects the appropriate batch of a block being processed. This displays a problem or solution for the selected batch, the confidence factor associated with the problem/solution, associated amounts and possibly some additional information in order to help the user reconcile the batch. FIG. 10-4 illustrates a solution having a 100% confidence level for a batch, while FIG. 10-5 illustrates a 90% confidence level.

FIG. 10-6 illustrates the Entry Sources screen. This screen is displayed when the users presses go on a batch in the Batches Balanced Screen and one of its solutions is Destination reentry. It displays the source batch numbers of the batches whose amounts were reentered, the amount and the type of amount (credit or debit). The screen graphically shows the movement of the items to clarify the information for quick operator knowledge. FIG. 10-7 illustrates a similar screen for Batches balanced when one of its solutions is Source reentry merged. In both situations, Prebalance has adjusted the total amounts accordingly.

FIG. 10-8 illustrates the Over/Short situation, showing before and after transaction balancing.

FIG. 10-9 illustrates a batch which has a result of "Ticket Reentry Wrong". It displays the ticket amount of the current batch which was originally entered and also the amount which the prebalance module has determined as the correct amount.

Batches are sometimes mixed. The Mixed Batch Ticket Screen of FIG. 10-10 illustrates a mixed batch solution. The screen displays the batch or batches that the batch ticket of the selected batch was mixed with and the associated amounts.

FIG. 10-11 illustrates the Reentry History Screen. Here a history of items (say up to 500) may be displayed for the entire entry history for the out-of-balance batches of the selected block. This history is identified as a free item (F), a missing item (M), a prime item (P) or a reentry item (R). This information is from the batches at the time that the block was downloaded.

FIGS. 10-1 and 10-12 are illustrative of a pop-up or help screen relating to problem/solutions, which would appear upon a help screen. More detailed help screens are available.

The screens are controlled by the operation initiated when the first balancing screen illustrated by FIG. 11 appears.

FIG. 11 illustrates the first balancing screen to appear, the Blocks to Balance screen. The purpose of the blocks to balance is to display information about all of the out-of-balance blocks from the item processing system (e.g., the Unisys IPS 701). The blocks are listed in order by status and block number. The order of the states is 2,P,1,C,A and S. It also allows the operator to select a particular block to be reconciled. Status 2 means balanced by the expert system. P means partially balanced, but could not be expert balanced. Status 1 means currently in the expert system, with prebalancing done. Status C means completely balanced by the operator or by the Prebalance Module. Also, as the status can always be changed by an authorized supervisory operator. Status A means that the status was approved by the Supervisor, while, Status S means that no processing could be performed on this block by the Expert Reconciler. In this illustration, the S status, which also illustrates the amount items are off. Presumably, the operator would choose the batch with Status S for primary processing, following by the one with Status P. Fortunately, this example illustrates the need for operator intervention in the balancing operation, as in block number 8656 no batches balanced. Nevertheless, the presently described system is effective for substantially reducing the operator time in reconciling operations, and directly the operator to the large out-of-balance blocks to balance.

The interface resident in the procedural modules and the expert module will be described with reference to FIGS. 12, 13 and 14, and our preferred embodiment of cross call handlers illustrated by FIG. 15. Before establishing the procedure illustrated by FIG. 15, which is our preferred embodiment, as illustrated by way of examples, external routines could not access the control structure of KES, and thus KES could not be used in an embedded mode interacting with conventional data processing modules illustrated by the user interface reconciler module 212 and the prebalancing module illustrated by the conventional processing module of the procedural module 215-220. As a result KES could not communicate with the external database established by standard application software and the file transfer modules which may be understood to include data based file information, as we have described.

As stated above, the described system differs from prior systems in the expert field, where expert systems were standalong devices. As an example KES II Knowledge Engineering System marketed by Unisys Corporation could not perform the functions described herein. FIG. 12 represents a basic embedding process, which assumes that a controlling application program is written C, as assumed by the KES II manuals. Thus in this example, application programs (the expert and all procedural modules, could be written in C to utilize specifically the expert inference engine and knowledge base functions of C). However, this example could not cause KES to handle conventional data processing with applications programs written in any language other than "C". Accordingly, the procedural processes which we describe, including all modules described in performance of the file transfer, prebalancing, reconciling, as well as the expert module would have to be written in "C". While we are capable of writing these in FIG. 12, the topmost block in the flow diagram illustrated processes in "C", one of the features of the present inventions is that the described system cannot only utilize conventional processes (data processing applications which could be written in C, Pascal, Cobol) but can utilize a variety of existing programs written in different languages (e.g., C and Pascal) and also execute both conventional data processing processes such as addition and subtraction of many numbers and other operations typically written in either Cobol or Pascal.

In FIG. 12, the topmost block 1201 represents the main body of the expert application program. The cluster of arrows which lead from it represent various calls to library functions (many subroutines) 1202 resident in KES.0. It will be noted that we have in the process of embedding KES stripped KES of all of its user interfaces, and we have supplied instead a screen manager 1204 which communicates with the expert application program 1201. KES.0 (1201) represents a general purpose expert subroutine library of functions for inferencing and heuristic processing, and knowledge base handlers. KES does not have linkers, as do UNIX and BTOS operating systems. We have utilized also the KES structure in a Unix or BTOS operations system environment, multi-tasking operating systems employing Linker facilities, and accordingly the links between these elements of the control structure are represented by the arrows between the application program 1201 and the screen manager 1204 (implemented by a call), the arrows between the application program 1201 and KES.0 1202, and the arrows between the call handlers 1203 and the screen manager 1204, and between the inference functions 1202 and the call handlers 1203.

At the bottom of this FIG. 12 illustration is another piece of application code which can be written in C. This is the screen manager defining the KES user interface functions (as does an interface portion of the display functions of the Reconciler). The Reconciler which in the preferred example is written in Pascal, performs similar functions, but it is written in another language, not C as in the current example. This screen manager is called directly by the top level application routines whenever data is to be passed to or from the end user's terminal.

Now we have represented KES.0 as one large unit. Alternatively, it could be represented as two structures, one where it is shown, and another sandwiched between the Call Handlers 1203 and the screen manager 1204. The second structure would not call the call handlers.

As part of this embodiment, we have provided a new use for the three Call Handlers described, the KES_receive_message; the KES_give_value_string and KES_g_members. KES II makes these calls when it needs to display information (and/or) solicit information from) the end user. Since we have stripped KES of any user interface, it is not permitted in the embedded mode. Instead, we have provided application-supplied routines for these I/O functions, which we have designated as Call Handlers 1202 and their function is message passing. In other words, the call functions defined in KES as control functions have been replaced by new Call Handlers having the same name but bi-directional functioning links having message passing functions. In turn, these I/O functions call the applications screen handling module.

As a result, the reader should distinguish between calls from KES to that part of the application designated Call Handlers, and the return of control that KES makes to the application top level. Thus function calls proceed down the arrows, and procedure exits will cause a return in the reverse direction of the arrow.

To illustrate the difference, KES does have call functions, represented by the arrow in the call handler which loops up back to KES.0. This is not a return to KES but a call. The call handler message link function calls proceed down the arrow, and the procedure exists cause a return in the reverse direction. The power of Call Handler messages can be better understood when two different languages are considered.

One embodiment of this two language approach may be illustrated by FIG. 13, where the KES structure becomes a server to the Client written in Pascal. However, this embodiment continues the message passing function. The diagram shows one possible structure for the KES server process and the message handling parts of the application process. Since this diagrams shows more internal detail than FIGS. 12, 14 and 15 (which is represented later with detailed description of code which actually making links between C and Pascal possible by cross call handlers), the meaning of the FIG. 13 arrows is slightly modified. Downward arrows which pass from box to box represent a function or procedure call; the correspond return to the caller being shown by a separate upward arrow passing from box to box. An exception to this convention with regard to FIG. 13 is the call Handler call to the Message Analyzer with a new request. This is represented by the double line on the right hand side of the diagram.

In the embodiment illustrated by FIG. 13, the KES server structure is illustrated. The program embeds KES as has been described in FIG. 12. Apart from KES.0 1303, the program consists of the Main Control Routine 1301, the Message Analyzer 1032, and three KES call handler 1304 (the same three), one of which is illustrated.

The Main Control Routine contains the program's overall control loop. This routine must first allocate one or more BTOS Exchanges for message passing purposes. The identifiers of these Exchanges must be stored somewhere for the Client (e.g., the Reconciler) to access. This assumes the server is started prior to the client (as the Prebalancer and Expert module may start in the background). The routine then waits for a message to arrive from the client (the reconciler or prebalancer). When a message arrives, it is passed in a call to the Message Analyzer. Eventually the Analyzer will return with a response message, and the Main Control Routine sends this to the Client awaiting the next message.

The Message Analyzer performs a number of function. First the Analyzer is responsible for validating incoming messages and rejecting those in error. The message protocol supports such error responses to the client. Second the Analyzer translates an incoming valid message to a KES function call, and calls KES appropriately. Third, function responses from KES must be translated to message format and returned to the Main Control Routine. Alternatively, a function not shown for the analyzer would be to recognize a shutdown message from the client which would cause the orderly termination of the server. Otherwise the server would continue to execute after the client has terminated. This function is not necessary if manual function is considered adequate, so the function is not illustrated in detail, it being understood that the drawing illustrates either manual or automatic shutdown.

As a result of the process, the user and application programmer need not know the inner workings of KES.0. As a result of message passing, the control structure is quite simple. As KES processes each request, it determines whether it has all the information it needs to complete the processing or whether it must call the application (the operator) for more information. In the former case, the request is simply processed in the background. In the latter case, KES calls one of the three message routines which we refer to as call handlers. Only one (any one) is illustrated in FIG. 13. It is within the scope of this description that all the KES control functions can be converted into control structure message passing routines as described with respect to the three we utilize. Indeed, all can be cross linked as described in FIGS. 14 and 15. In the embodiment illustrated in FIG. 13, the only thing done with this call from KES is to pass it to the application, as is done in the pure C embedding case of FIG. 12. The message protocol from the server to client supports not only responses from KES to client, but also calls from KES for more information. On the client side, once a request has been made to the Server, the client is programmed to expect either a response to the request or a request of the client from KES.

The client can either receive a response which corresponds to its request, or it can receive a request from KES for more information. In the latter case, the Client may need to call KES to get more information which it needs in synthesizing its eventual response to KES's request. Thus the client may "stack" up a plurality of calls to KES, and the Reconciler allows the operator to supply answers.

Each of the KES Call handlers must format the KES request as a message, send it to the client, and await a response. As must of this processing goes on in the Message Analyzer, common functions can be used here. Normally, the Call Handler will receive a response message from the application, format it appropriately and return to KES. However, on some occasions, the applications will need to call KES again in order to get information it needs to satisfy KES's request. So the response to the Call Handler could be a fresh, independent KES call. In this case, the Call Handler must call the Message Analyzer with the new request. This call, and its subsequent return, is represented by the double line on the right hand side of the diagram. In this instance the logic performed in the Message Analyzer is the same as other operations performed by the Message Analyzer which have been described, except that any return from the Analyzer goes back to the Call Handler and not the Main Control Routine. When the Call Handler eventually receives control again, it returns back to KES, just as for the simpler cases.

Now with respect to FIGS. 12 and 13, the application routines need to consider memory when working in the embedded mode. Both Unix and BTOS dynamically allocate memory, and KES.0 also dynamically allocate small chunks of memory to hold values that it returns to the calling application program.

In following the example illustrated by FIG. 12, the routine may take advantage of the C library function FREE. The memory blocks may be read in any order because the allocation function (MALLOC) maintains a structure which records the blocks individually. As KES.0 always returns a pointer to any memory block which it allocates, the routine may use FREE and the KES.0 pointer for later release of the memory. We illustrate a preferred method of handling memory allocation in the examples with respect to FIG. 14. With a long running, interactive system as we have described, the programmer would typically have to keep track of all of the allocated chunks of memory and decide what can be freed and when, or he could ignore the memory problem and allow allocation of memory to be solved when the program terminates, but this could with a larger program exhaust the available supply.

The use of Pascal and C, mixing different language originated routines, raises many complications. Any memory allocated by KES using the C library function MALLOC is released by the corresponding C library function FREE. Pascal cannot release KES-allocated memory blocks in the same way that C could. The problems of memory management in a multi-language environment are aggravated in a message passing environment. As KES allocates memory, the memory needs to be released by the interface. Thus, as illustrated in Example 1 with reference to FIG. 2 along with FIG. 15, before a call handler interface with respect to the Call Handler function could declare a prompt, and after executing the pass value string, free the memory allocated by KES is freed.

As also illustrated by Example 1, we define the amount of memory necessary for running the knowledge base by declaring (#define MEM SIZE) the size amount of memory in bytes) for running the knowledge base based upon the running time and the requests made to KES.

A method of handling memory contemplated by the present disclosure contemplates a client making a copy of the memory allocated by the server. The dynamic memory allocation and copying can be done within the common message handling interface (as in Example 2 of FIG. 15) on the client's side, so that the KES application is relieved of the responsibility. The KES server remembers the blocks it last handed to the client and releases that same block on the next call from the client, or after the passing. This passes the memory handling responsibility over to the client process, but operates in much the same was as in the pure C environment. Thus, within the client process, the common message handling interface would allocate a block of memory, copy information presented by the server, and pass the result to the application. The conventional language interface will utilize a function for releasing blocks, similarly to the C function FREE. Now, as the described application needs only a limited set of declared variables to contain information coming from DES, the Pascal routine would copy information returned from the common message handling interface, and then call the interface to release the block immediately. Accordingly, by reference to this description, and the examples, the memory allocation problem in the message passing environment is solved.

When one appreciates that we have solved the problems of linking programs written in different languages in the expert-conventional processing environment, that procedure has allowed us to separate the application code form DES, making each a separate, asynchronously running process. The information is passed back and forth through the message interface. Thus as illustrated by FIG. 13, the KES process becomes a server, performing a sub-task, and responding to messages that represent KES function calls, and the process control application becomes the client, sending messages to the server and expecting a reply.

Both BTOS and Unix have queue management facilitating message passing at the application level. In BTOS the queues are called "Exchanges". In the asynchronous process described in FIGS. 14 and 15 when the client sends a request to the KES server, the client will be suspended until the server furnishes a response message, at which point the client process will continue, using the information returned by the Server. The KES server waits for messages from the Client; when one arrives, the server processes it and sends a response message to the client, whereupon the server enters the wait state once more. Thus, this arrangement provides an emulation of the usual synchronous function call and return within a single process.

When one appreciates that the above describes a solution to the memory management issue, which is more complicated in message protocols with two languages, then the advantages of the message passing approach will become more apparent. Since communication is purely through messages, the server and client may be written to match the desired purpose in the most appropriate language. Thus we have written the server portion entirely in C, to match the KES implementation, and the control programs which make heavy use of a database in Pascal.

The use of KES in the embedded mode, which we describe, is more complicated that use of a standalone process; however, the advantages permit control of the end user interface with a program which allows total control over end user interaction, allows logical and expert and/or database processing as necessary without the necessity of rewriting that portion of the program (and thus making it not accessible to other programs), as the IPS data based application has been employed in the present described environment. In other words, this facility makes it possible to use the existing environments programs, making it extremely adaptable to a variety of expert applications. The organization needing the application need not have, and may not have, access to the source code of all of the programs in which the expert application runs. Furthermore, this permits large volumes of data to have their essence passed to KES, and permits this to happen very quickly. In a standalone process, such data must be passed by writing and reading files.

The description of FIGS. 12 and 13 lead to an understanding of the alternative embodiment of the embedded KES within a Pascal control program (the Reconciler and Prebalancer modules) illustrated by FIG. 14. FIG. 14 represents a description of the embedded expert module within a control program having a link to and from PASCAL and C, permitting operations of programs to operate asynchronously and in the background mode.

Until the interface described herein was developed, linking PASCAL and C appeared to be ruled out. The preferred embodiment of this interface is described with respect to FIG. 15 and the specific examples for message passing described in Examples 1 and 2.

Alternatively, as described with respect to FIG. 14, the KES.0 modules could be embedded by being "wrapped" inside two interfaces. The Pascal to C interface handles message passing to KES (Example 2) and causes the C interface to KES to initiate KES functions, and the C to Pascal interface handles message passing from KES returning results. Thus the PASCAL to C interface 1402 presents to the Application top level 1401 (written in Pascal). The arrow conventions of FIG. 12 apply. The Pascal to C interface 1402 presents to the application top level and interface which is analogous to the normal KES.0 interface. This interfacing routine performs the translation and takes care of the difference in convention between the languages, for example the handling of strings. KES.0 illustrated at 1403 contains the library functions of KES.0 and KES may thus directly call, as a KES call, the C to Pascal interface 1404 which would be written in Pascal and would perform the functions similar to the Pascal to C interface 1402. This would in turn call the KES call handlers, this time written in Pascal but performing the same functions as those of C described with respect to FIG. 12. In all other respects this structure is similar to FIG. 12.

Now, turning to the preferred embodiment, a true asynchronous cross call interface may be described with respect to FIG. 15 and the specific examples.

In order to illustrate our preferred embodiment by way of specific example, we will set forth hereinbelow first "C" code which has access to the library of KES, and then PASCAL, which will interface the PASCAL procedures of the reconciliation to the "C" control structure which is embedded within KES. Two sets of functions were written, implementing three "C" functions as functions written in "C" and three "PASCAL" functions written in Pascal. The "C" functions are:

1. Start: (This function calls the KES library functions Kes_ld_kb, Kes_run_actions, and Kes_free_kb and is initiated by a Pascal procedure called "kesstart" described below).

2. Kes_receive_message: (KES will pass to this function any messages that appear on the screen during an interactive session with KES)

3. Kes_give_value_str: (KES calls this function when it needs an attribute value).

These three functions are included in the following illustrated example of a routine written in C according to the KES.0 application protocols (almost identical to ASCI C) and embedded within KES. It will be noted that certain inclusions from KES are included in the procedure, and other functions and definitions made for pointers and the like which are illustrated by the particular examples.

The Pascal functions are:

1. Kesstart (with C start declared as an external function). (This function calls the initiation of "start" (embedded as in "C" above within KES).

2. Pas_value_str: (This code procedure is called by Kes_give_value_str. Its main function is to return responses to KES prompts. In the example, in our case the two responses we need is an answer to the question as to whether or not the operator desires to reconcile another block, entered by the screen or cursor, and if the answer is yes, to provide the block number).

3. Pas_receive_message: (This code procedure is called by Kes_receive_message. Its function is to store the messages received form KES for later processing.)

The following examples may be understood to be written according to the ASCI standard for the languages, as implemented for execution by machines with either the BTOS Operating system, Microsoft OS, or UNIX operating systems with the appropriate compilers.

3. Pas_receive_message: (This code procedure is called by Kes_receive_message. Its function is to store the messages received form KES for later processing.)

The following examples may be understood to be written according to the ASCI standard for the languages, as implemented for execution by machines with either the BTOS Operating system, Microsoft OS, or UNIX operating systems with the appropriate compilers.

EXAMPLE 1 (C embedded in KES)

```c
#include <stdio.h>
#include "kes.h" /* This is Kes data type definitions and function header */
        /* note that these are the declarations of the variables for interface with the Pascal routines called pas value str and pas_receive_mesg for passing the Pascal value string and the Pascal receiving message described in the Pascal language below */
        void pas value str plm far(char *far prompt. char * far rep buf);
        void pas receive mesg plm far(char **far string, int msg_class);
#define KNOWLEDGE-BASE "IR.pkb"
#define MEM_SIZE 80000
/*=================================================*/
char rep_buf[80];
/*=================================================*/
/* This is the Start function called by Pascal kesstart */
void start ()
{
/*The following declares the attribute descriptors and other variables when an expert sub-task initiated by this start is called by the Pascal kesstart main procedure */
/* Initialize the variables */
while (0 == 0)
/* Load the knowledge base declared above */
KES_ld_kb(KNOWLEDGE_BASE.MEM_SIZE);
/* Run the procedure called actions described in Kes routings */
KES_run_act ons( );

/* This frees the knowledge base allocated memory */
KES_free_kb();
}
/* Note - During processing of this start routine the Kes actions can also pass to Kes_receive_mesg, any messages that appear on a screens during an interactive session with KES after this start call is made and Kes can call the function Kes_give_value_str when it needs an attribute value during this process.*/
/*=================================================*/
char *KES_g_members (class_name)
        car *class_name;
{
return(class_name);
}
/*=================================================*/
char *KES_give_value_str(attribute_descriptor)
     KES_atr_type attribute_descriptor;
{
        char *prompt;
/* This gets prompt from KES to display */
        prompt = KES_g_askfor_prompt(attribute_descriptor);
/* Note the pascal value string */
        pas_value_str(prompt.rep_but);
/*free memory allocated by KES */
```

```
            free(prompt);
            return(rep_buf);
}
/*===================================================*/
void KES_receive_mesg(string,msg_class)
            char *string;
            KES_msg_class_type msg_class;
{
/* note the pascal receive message */
            pas_receive_mesg(string,msg_class);
}
/*===================================================*/
      EXAMPLE 2 (PASCAL Procedure Interface Routines)
(*===================================================*)
procedure start: extern;
procedure kesstart [public]
begin
            start;
end;
(* Note - this Pascal "kesstart" procedure calls the start
section of the "C" routines above when it is desirable
necessary to call it (as indicated by an out of balance
situation determined in the background or as determined by a
keyboard entry upon display of blocks to be processed by the
main Pascal program illustrated by th› flow diagrams, or
others and that is specified in another section of the main
Pascal program which controls the overall procedures, and when
that C start procedure is finished, there are no answers
expected except as called for by the expert system, which
passes the information via the pas receive mesg, and no
information furnished until called by the pas value str
routine of "C".
(*===================================================*)
procedure   pas   value   strZ(prompt.rep   bug   :STR   POINTER)
[public];
VAR
KEY         :bite;
Fname  :  lstring(20);
BLK         :  lstring(4);
F           :  WORD;
I           :  integer;
begin
            if FIRST TIME
            then begin
                KEY:=0;
while KEY,> GO
do begin
            KEY;=PROCESS BLK_SELECTION;
            if (BLK_INFOR^[SEL_ST+SEL-1].BATCHES.BAL<51) and
               (BLK_INFOR^[SEL_ST+SEL-1].BATCHES_TO_BAL <21) and
               (   (BLK_INFOR^[SEL_ST+SEL-1}.BATCHES_BAL+
                   BLK_INFO^[SEL_ST+SEL-1].BATCHES_TO_BAL) < 60)
            then begin
            if KEY = 16#31
            then if (BLK_INFO^[SEL_ST+SEL-1].BLK_STATUS = 'p')
               then ERC:=BEEP
               else CHANGE_BLK_STATUS
```

```
              else if KEY = 16#30
                  then begin
                      READ_BATCH_INFO(FILE_SEL);
                      PROCESS_PRE_BAL(F10)
                  end
                  else
                      if BLK_INFO^[SEL_ST+SEL-1].BLK_STATUS = 'p'
                      then KEY:=PROCESS REJ_ENTRY
                  else begin
                      READ_BATCH_INFO(FILE SEL);
                      DIS_KES_RESULTS;
                      KEY:-0;
                  end;
              end
              else begin
                  ERC:=BEEP;
                  KEY:-0
              end;

end;
for I:-1 to MAX_REJ
do REJ_REJ^[i}.SEQ_NO:=NULL;
ERC:-writefield(ads WORK_AREA.ada 'ERR'.3.0.
        ads ' Please Wait'.16.ads character);
ERC:-writefield(ads WORK_AREA.ads 'ERRT'.4.0
        ads ' Reconciling In Progress' 25,ads character);
ERC:=SETFIELDATTRS(ADS WORK_AREA.ads 'ERRT'.4.0.'I');
READ_BATCH_INFOR(FILE_SEL);
Fname:=File_sel;
movesl(ads 'res' ,ads Fname[7],3;
ERC:=OPENFILE (ads F,ads Fname[1],fname.len.ads ' '0.modem);
ERC:=DELETEFILE(F)
ERC:=OpenDaFile(ads  DWA,  ads  fname[1],  fname.len.ads.  '
'.0.MODEM.
            DMA, 1024, 50);
CHECK_ERC(ERC);
MOVESL(ads BLK_SEL[1], REP-BUF, BLK_SEL.len);

FIRST TIME:+FALSE;
end
else begin
    BLK:=NULL;
    ERC:=CloseDaFile(ads DWA);
    DIS_KES_RESULTS;
    CONCAT(BLK,BLK_SELECTED);
    UPDATE_BLK_status(blk, 'k');
    REP_BUF^[0]:='1';
    REP_BUF^[1}:=chr(0);
    FIRST_TIME:=TRUE;
    KES_RESULT_INDEX:=1
 end;
end;
```
(*Note that this system first has used start to call the start of the C example embedded in KES, and when KES needs display and or conventional processing this routine is called and it passes values to the KES and displays the KES results. It operates via a network including a modem. It also permits the operator to continue with another block (BLK) by answer "yes, asking for the new block selected. The results of KES are stored in STORE_KES_RESULTS(STR) also as a string by the procedure pas_receive_mesg below. All are "public" procedures callable by several compiled programs which may have been written originally in other languages. The compiler in question must provide this function.
=====================================================*)

procedure pas_receive_mesg(str:STR_POINTER; class:integer) [public]

begin
  if class = 5 then STORE_KES_RESULTS(STR);
end;

(* Note - the value 5 is one expected value which when there is the flags by which the KES results are stored in the reconciler. It is stored in the event the operator approves the results of KES in an interactive session.

=====================================================*)

Thus turning now to Figure 15, it will be seen that the control program, has a Pascal interface which can be accessed at any time by a call to a function by the main Reconciler 1501 or Prebalancing module 1502 (both of which are written in Pascal and interface with the IPS file system). These functions, as described above by way of example, form part of the Call Handler interface 1503. The Call handler includes a procedure Kesstart which initiates Start within C which in turn calls upon KES.0 1504 to load the knowledge base, run actions, etc. During an interactive message handling routine with the Reconciler, Kes_receive_mesg is passed any messages that appear on the screen. Then Pas_receive_mesg which is called by Kes_receive_mesg stores the message received for later processing. When KES needs an attribute value for its functions, it can access the data processed by the Pascal portion of the system by calling Kes_give_value_str. This in turn calls Pass_value_str, which Thus turning now to FIG. 15, it will be seen that the control program, has a Pascal interface which can be accessed at any time by a call to a function by the main Reconciler 1501 or Prebalancing module 1502 (both of which are written in Pascal and interface with the IPS file system). These functions, as described above by way of example, form part of the Call Handler interface 1503. The call handler includes a procedure Kesstart which initiates Start within C which in turn calls upon Kes.0 1504 to load the knowledge base, run actions, etc. During an interactive message handling routine with the Reconciler, Kes_receive_mesg is passed any messages that appear on the screen. Then Pas_receive_ mesg which is called by Kes_receive_mesg stores the message received for later processing. When KES needs an attribute value for its functions, it can access the data processed by the Pascal portion of the system by calling Kes_give_value_str. This in turn calls Pass-_value_str, which functions to return to KES responses to the Kes prompts which are initiated by Kes after processing and in response to the instructions provided by the operator during its interactive session. This linkage of Pascal and C Call Handler functions provides an interface which permits both the conventional and expert systems to run concurrently and asynchronously by cross call handlers.

The above cross calls between two higher level language routines (C and Pascal and with the note that standard ASCI Pascal could not to our knowledge call another language routine before) enable the conventional processor to create and utilize for sub-tasks, expert, knowledge based or inferential and heuristic processes, in a multi-tasking, multi-processor workstation and network distributed processor environment.

It will be and should be understood also that the language driven computer system is a general purpose computer, in which the control codes are written in a higher level computer language such as C or Pascal, and then these control codes are compiled and executed within the system as run time digital code. Multi-tasking systems includes those systems such as BOS, UNIX, XENIX, Microsoft OS and other multi-tasking system which permit different tasks to operate concurrently. It is a feature of the present inventions that the subsystems described may perform different tasks concurrently, and asynchronously, in not only a multi-tasking system, but in a distributed system as well, including in the distributed system single and multiple processors which may run in parallel.

While we have described our inventions in detail, it will be understood that persons may make improvements and further inventions based upon the described inventions, both now and in the future, without departing from the scope of the inventions claimed in the claims which follow.

We claim:

1. A document processing system for use by an institution for processing debit and credit items after said items have been read, comprising multi-tasking general purpose computer processing means for processing document related data relating to debit and credit amounts which have been provided and for which a verification of provided balances is desired, including means for storing the results of reading said debit and credit items after said items have been read as blocks of items with batches within said blocks of items, means for storing provided balances resulting from earlier processing of items for which there is a desire for verification of provided balances for use by said institution, a prebalancing module means for mathematically determining the balance for debit and credit items of batches and blocks of items which have been read, for determining the balances for the blocks and batches read, and for comparing the same with provided balances for corresponding blocks and batches provided and for which verification is desired, said prebalancing module means controlling the operations of said computer processing means by a sequence of steps of a prebalancing process, an expert module means integrated into said computer processing system such that expert module means operations are performed as a subtask thereof, said expert module means having a knowledge base and an inference engine for processing data resulting from operation of said prebalancing process, and display means for displaying to a user information provided by said prebalancing module means and said expert module means, including data relating to said debit and credit amounts and said balances.

2. A document processing system according to claim 1, wherein said knowledge base contains information and rules for the reconciliation of items processed in a banking system at the request of a receiving bank desiring reconciliation of the items received by it from a sending bank.

3. A document processing system according to claim 2, wherein said expert module means provides for writing and saving in a block data file the results of its processing including solutions to an unbalanced item problem along with confidence factors relating to such solutions, and wherein data relating to said solutions is displayed on said display means.

4. A document processing system according to claim 3 wherein there is provided a reconciler module means for use in connection with said expert module means, whereby said reconciler module means and said expert module means interact to provide expert reconciliation solutions for a user.

5. A document processing system according to claim 1, wherein said display means displays to the user details of an expert module means problem and its apparent solution.

6. An expert reconciler system for use in connection with items processed as blocks and batches in a banking system, comprising, temporary file store means for storing as database information relating to blocks and batch information of said banking system,
processing means for processing data,
display means for displaying database information to a user, said display means including user selection means for selecting data to be displayed,
a user interface reconciler module means for determining and displaying on said display means to a user data relating to information processed by said processing means, said data relating to said blocks and batch information of said banking system, and said user interface reconciler module means including means to display on said display means to a user of:
prebalancing solutions and expert solutions,
blocks to balance and the offering of process block selection options, including change of the block status, general block information,
batches to verify and expert solutions and
batches balanced and prebalance solutions therefor, and then optionally
expert problem/solution detail, or at user selection by said user selection means, prebalance solution detail.

7. An expert reconciler system according to claim 6, wherein said system further includes a prebalancing module means and an expert module means and includes a temporary store for files relating to data processed by said prebalancing module means and said expert module means, and wherein said data displayed to a user is provided by said processing means from said temporary file store means.

8. An expert reconciler system according to claim 7 wherein said temporary file store means includes an indexed sequential access file so that blocks may be processed by said processing means in accordance with an index, or sequentially.

9. An expert reconciler system according to claim 6 wherein, said user interface reconciler means includes means for processing data according to a sequence of processes, and wherein the first step of this sequence of processes includes switch and delay means and controls for reading the temporary file store for data in order to determine if there are any files available for display, and if there are any, then control is passed to a subsequent processing structure, and if not the reading process is repeated after a predetermined delay.

10. An expert reconciler system according to claim 6 wherein there are means for display indicating the relative importance of difference of amount for a plurality of blocks to process and blocks to verify to a user, and means for enabling a user to process blocks and batches of a block in an order determined by the user.

11. A document processing computer system for system reconciliation of checks and other ticket items which need to be balanced, comprising:
a host system,
means for reading code lines of checks and ticket items in blocks and batches within blocks and storage means for recording the information read in organized blocks and batches within blocks,
means for attempting the balance of blocks and batches within said blocks, and
an expert processing module means for said computer system callable by message passing from a conventional data processing module means of said computer system whenever the need for an expert solution is recognized.

12. A document processing computer system according to claim 11 wherein said information read from said checks and other ticket items is stored in a database of information which is shared by said conventional data processing module means and said expert processing module means, said conventional processing module means and said expert module means presenting expert answers and conventional answers, respectively, to an operator of the system.

13. A document processing computer system according to claim 12 wherein the system has means for verification of said expert solution answers and a control sequence means to permit a non-acceptance and means for further processing either in an expert mode or in a conventional mode.

14. A document processing system for check and ticket item records, comprising,
a host processor computer system (101),
a reader/sorter (282) for reading data on checks and bank ticket items which is stored in a database of said host,
at least one workstation coupled to said host so as to become part of a multi-processor distributed processing environment with said host, said workstation having a multi-tasking operating system, said workstation including:
a conventional data processing module means (213) for performing prebalancing operations,
and expert module means (211) for processing data resulting from said prebalancing operations,
a user interface module means (212) for performing display and reconciliation functions, and
a file transfer module means (207) for transferring data to said host,
said host having a file transfer module means (107) for transferring data to said workstation, a data communication facility, standard application software controls, a large disk store and a host module means for processing and storing database information provided to the host module means by said reader/sorter,
said user interface module means functioning as a reconciler by providing means for reconciliation and the balancing of checks and ticket items passing between banks, said reconciliation being performed by concurrent and interactive communication between and action of said prebalancing operations, and said expert module means (211) which includes a knowledge base and interference engine as part of said expert module means.

15. A document processing system according to claim 14 wherein there are provided a plurality of workstations, said workstations having a display console, a keyboard and a printer coupled thereto.

16. A document processing system according to claim 15 wherein there is provided an interface call handler between said expert module means and said prebalancing operation module means, said user interface call handler permitting actions to be taken by the system by linked routines whether said prebalancing operation module means is established in the same language or in a language different from that established for said expert module means, permitting two different languages to be employed in establishing the routines for said expert module means and said conventional data processing module means.

17. A document processing system according to claim 16 wherein said interface call handler employs common control functions providing access to and callable from said expert module means and said conventional data processing module means thereby enabling said interface call handler to link with and send and receive messages between said expert module means and said conventional data processing module means.

18. A document processing system according to claim 17 wherein there is provided a customizer module means for the system which is coupled to the aforesaid module means so as to permit a system to be delivered to the user with a run time version of said expert module means knowledge base and said user interface module means routines which allows the user to change the established digital control codes in the run time version without recompilation of any routines established for the system.

* * * * *